United States Patent
Izumi

(10) Patent No.: US 9,831,944 B2
(45) Date of Patent: Nov. 28, 2017

(54) PROBE GENERATOR, OPTICAL TRANSMISSION APPARATUS AND PROBE GENERATING METHOD

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/074,277

(22) Filed: Mar. 18, 2016

(65) Prior Publication Data
US 2016/0315699 A1  Oct. 27, 2016

(30) Foreign Application Priority Data

Apr. 22, 2015  (JP) .................................. 2015-087835

(51) Int. Cl.
| | |
|---|---|
| H04B 10/073 | (2013.01) |
| H04B 10/077 | (2013.01) |
| H04B 10/54 | (2013.01) |
| H04J 14/06 | (2006.01) |

(52) U.S. Cl.
CPC ....... H04B 10/073 (2013.01); H04B 10/0775 (2013.01); H04B 10/541 (2013.01); H04J 14/06 (2013.01); H04B 2210/075 (2013.01)

(58) Field of Classification Search
CPC .......... H04B 10/073–10/0779; H04B 10/5053; H04B 10/541; H04B 2210/075
See application file for complete search history.

(56) References Cited

U.S. PATENT DOCUMENTS

| | | | |
|---|---|---|---|
| 5,539,566 A | 7/1996 | Terahara et al. | |
| 6,067,187 A | 5/2000 | Onaka et al. | |
| 6,661,974 B1* | 12/2003 | Akiyama | H04B 10/2513 398/158 |
| 2008/0232816 A1* | 9/2008 | Hoshida | H04J 14/06 398/152 |
| 2016/0261352 A1* | 9/2016 | Wen | H04B 10/532 |
| 2016/0282699 A1* | 9/2016 | Gottwald | H04B 10/50577 |

FOREIGN PATENT DOCUMENTS

| | | |
|---|---|---|
| JP | 7-99477 | 4/1995 |
| JP | 9-153865 | 6/1997 |
| JP | 11-202263 | 7/1999 |
| JP | 2013-195106 | 9/2013 |

* cited by examiner

Primary Examiner — David Payne
Assistant Examiner — Casey Kretzer
(74) Attorney, Agent, or Firm — Staas & Halsey LLP

(57) ABSTRACT

A probe generator includes: a first demultiplexer configured to branch a first optical signal having a first wavelength into at least two first polarized optical signals; a first adjustor configured to adjust the first polarized optical signals such that the first polarized optical signals have the same polarization direction and to combine the adjusted first polarized optical signals into a second optical signal; a first modulator configured to branch the second optical signal into at least two first split optical signals and to intensity-modulate each of the first split optical signals with first pilot signals; a second adjustor configured to adjust the first split optical signals intensity-modulated by the first modulator such that the intensity-modulated first split optical signals have different polarization directions; and an output unit configured to combine the first split optical signals adjusted by the second adjustor to generate a probe optical signal to be output.

8 Claims, 25 Drawing Sheets

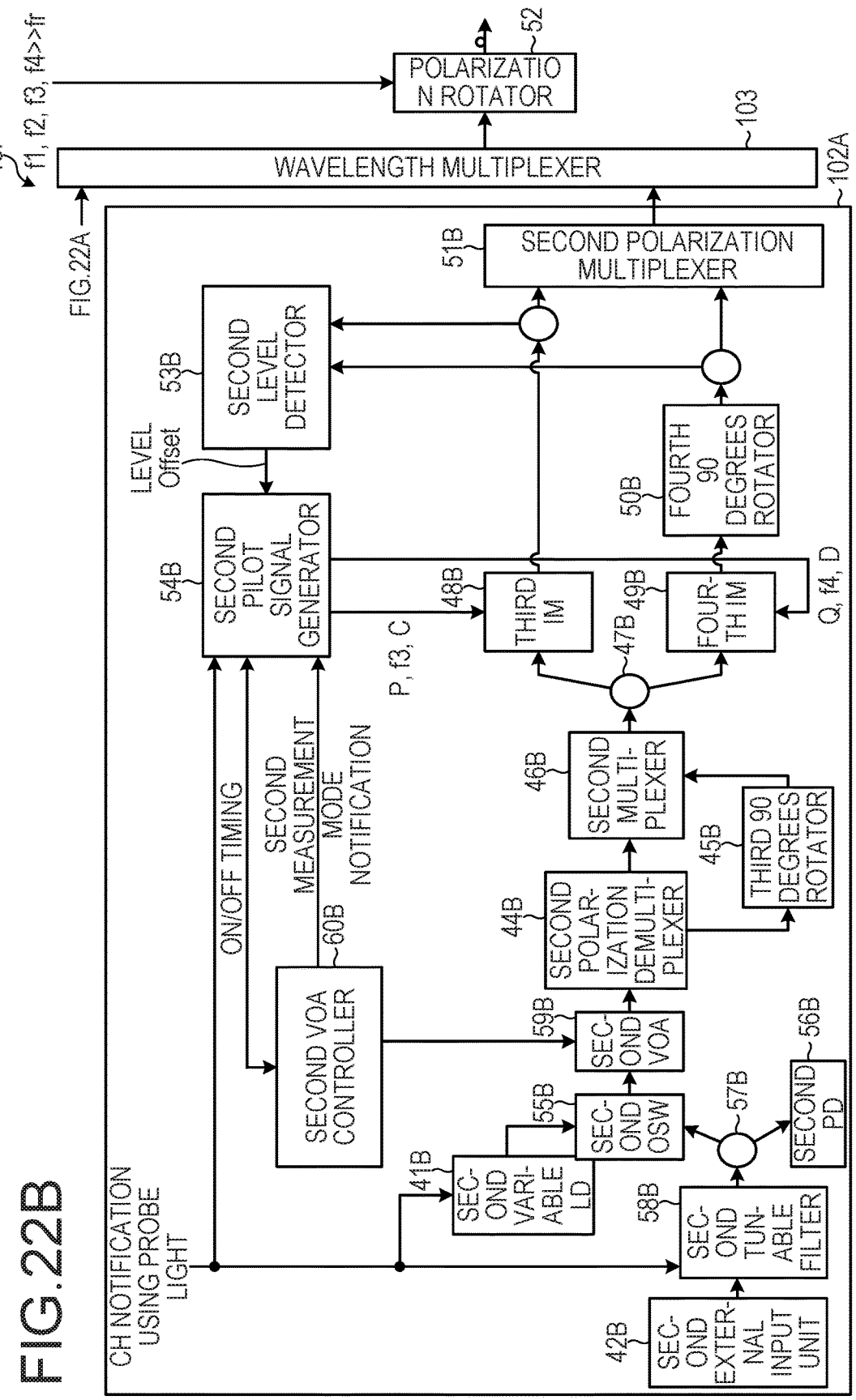

US 9,831,944 B2

PROBE GENERATOR, OPTICAL TRANSMISSION APPARATUS AND PROBE GENERATING METHOD

CROSS-REFERENCE TO RELATED APPLICATION

This application is based upon and claims the benefit of priority from the prior Japanese Patent Application No. 2015-087835, filed on Apr. 22, 2015, the entire contents of which are incorporated herein by reference.

FIELD

The embodiments discussed herein are related to a probe generator, an optical transmission apparatus, and a probe generating method.

BACKGROUND

Optical networks (NWs) employing a technique such as a WDM (Wavelength Division Multiplexing) technique are being constructed in large-scale backbone networks operated by carriers. The WDM technique is a technique that accommodates traffics of a plurality of users in optical signals having different wavelengths between nodes connected by optical fibers, and multiplexes a plurality of optical signals into an optical transmission line for a large-capacity transmission.

In the WDM technology, an optimal modulation scheme is selected depending on a transmission distance and the like, and as a result, a mixture of different modulation schemes such as QAM (Quadrature Amplitude Modulation), DMT (Discrete MultiTone Modulation), QPSK (Quadrature Phase Shift Keying), RZQPSK (Return to Zero QPSK) and the like may be employed in the WDM technology.

In the WDM technology, for example, when a section that causes an error is specified in an occurrence of the error, the cause section in an optical transmission line may not be evaluated only with a simple measurement of OSNR (Optical Signal to Nose Ratio) on the optical transmission line. Therefore, the cause section in the optical transmission line is evaluated by measuring OSNR for each transmission section.

Related technologies are disclosed in, for example, Japanese Laid-Open Patent Publication No. 09-153865.

SUMMARY

According to an aspect of the invention, a probe generator includes: a first demultiplexer configured to branch a first optical signal having a first wavelength into at least two first polarized optical signals; a first adjustor configured to adjust the first polarized optical signals such that the first polarized optical signals have the same polarization direction and to combine the adjusted first polarized optical signals into a second optical signal; a first modulator configured to branch the second optical signal into at least two first split optical signals and to intensity-modulate each of the first split optical signals with first pilot signals; a second adjustor configured to adjust the first split optical signals intensity-modulated by the first modulator such that the intensity-modulated first split optical signals have different polarization directions; and an output unit configured to combine the first split optical signals adjusted by the second adjustor to generate a probe optical signal to be output.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 22A-B are a block diagram illustrating one example of still another generator;

DESCRIPTION OF EMBODIMENTS

The Optical Signal to Nose Ratio (OSNR) may be measured by actually receiving a modulated signal itself and checking an error from the received modulated signal.

However, since the modulation schemes used in WDM are mixed as described above, the measurement of OSNR requires receivers corresponding to respective modulation schemes. Therefore, receivers corresponding to all modulation schemes used in WDM are required. However, this is impractical and, furthermore, it is difficult to evaluate a section that causes an error using OSNR.

In high-speed optical signals of WDM, factors of polarization-dependent waveform distortion, such as PDL (Polarization Dependent Loss), DGD (Differential Group Delay) and the like, become the main cause of errors. Therefore, since the section that causes the error is not evaluated only with measurement of OSNR for each transmission section, there is a need for measurement of PDL, DGD and the like.

Hereinafter, embodiments of a probe generator, an optical transmission apparatus and a probe generating method which are capable of outputting a probe optical signal to allow measurement of polarization-dependent evaluation values of PDL, DGD and the like on a transmission section will be described in detail with reference to the accompanying drawings. The following embodiments are not intended to limit the present disclosure and may be appropriately combined unless otherwise contradictory.

First Embodiment

Figure 1:
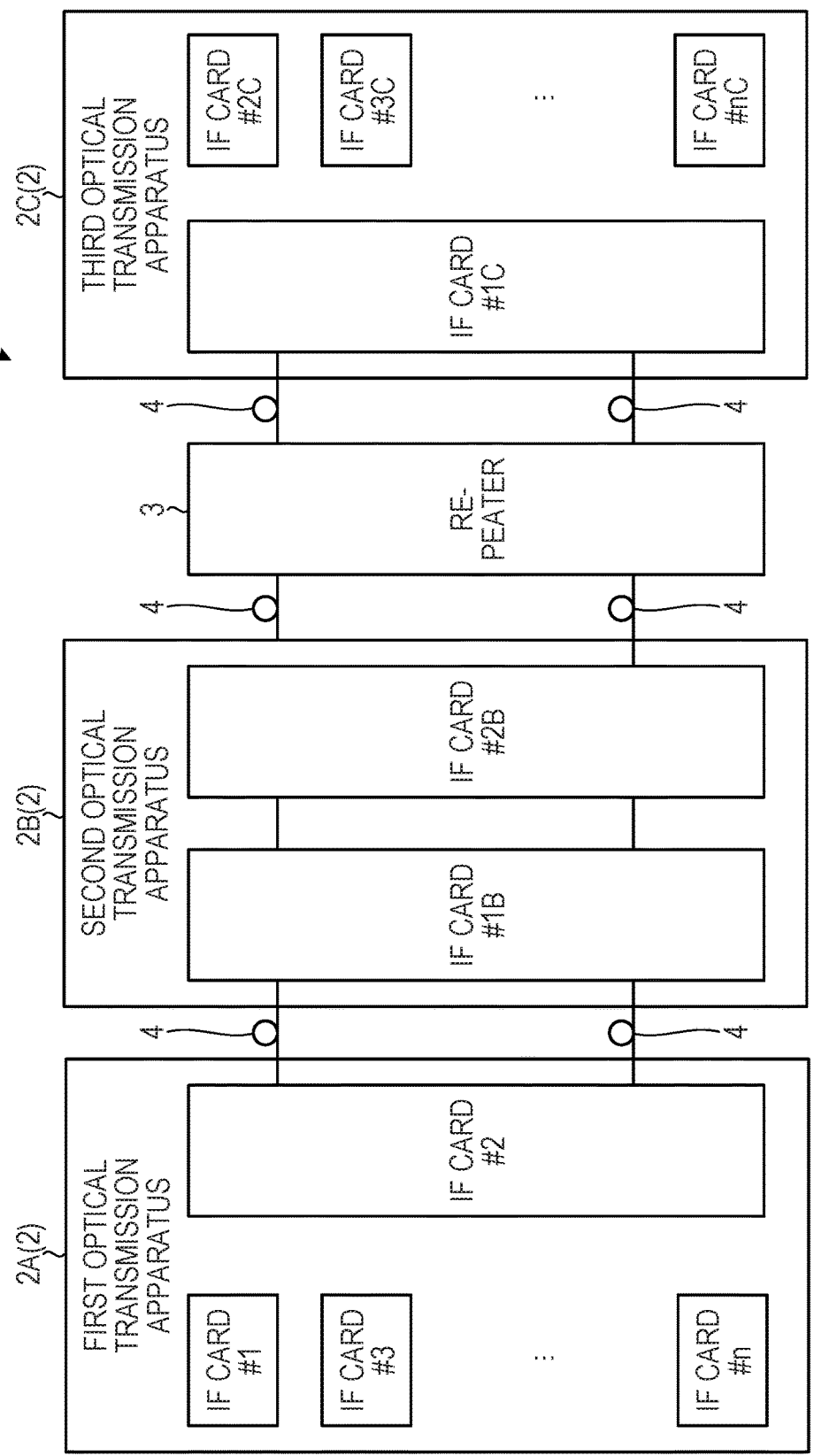
FIG. 1 is an explanatory view illustrating one example of an optical transmission system of First Embodiment.

FIG. 1 is an explanatory view illustrating one example of an optical transmission system 1 of First Embodiment. The optical transmission system 1 illustrated in FIG. 1 includes a plurality of optical transmission apparatuses 2 and a repeater 3. The plurality of optical transmission apparatuses 2 includes, for example, a first optical transmission apparatus 2A, a second optical transmission apparatus 2B, and a third optical transmission apparatus 2C. The first optical transmission apparatus 2A is connected to the second optical transmission apparatus 2B via an optical fiber 4 and performs a WDM transmission with the second optical transmission apparatus 2B. The second optical transmission apparatus 2B is connected to the repeater 3 via the optical fiber 4 and performs a WDM transmission with the repeater 3. The repeater 3 is connected to the third optical transmission apparatus 2C via the optical fiber 4 and performs a WDM transmission with the third optical transmission apparatus 2C.

The first optical transmission apparatus 2A includes a plurality of IF cards #1 to #n, the second optical transmission apparatus 2B includes a plurality of IF cards #1B and #2B, and the third optical transmission apparatus 2C includes a plurality of IF cards #1C to #nC. Each IF card # forms a communication interface, which is a so-called Degree, for communicating with the optical fiber 4.

The IF card #2 in the first optical transmission apparatus 2A is connected to the IF card #1B in the second optical transmission apparatus 2B via the optical fiber 4. The IF card #1B in the second optical transmission apparatus 2B is connected to the IF card #2B in the second optical transmission apparatus 2B. The IF card #2B in the second optical transmission apparatus 2B is connected to the repeater 3 via the optical fiber 4. The IF card #1C in the third optical transmission apparatus 2C is connected to the repeater 3 via the optical fiber 4.

Figure 2:
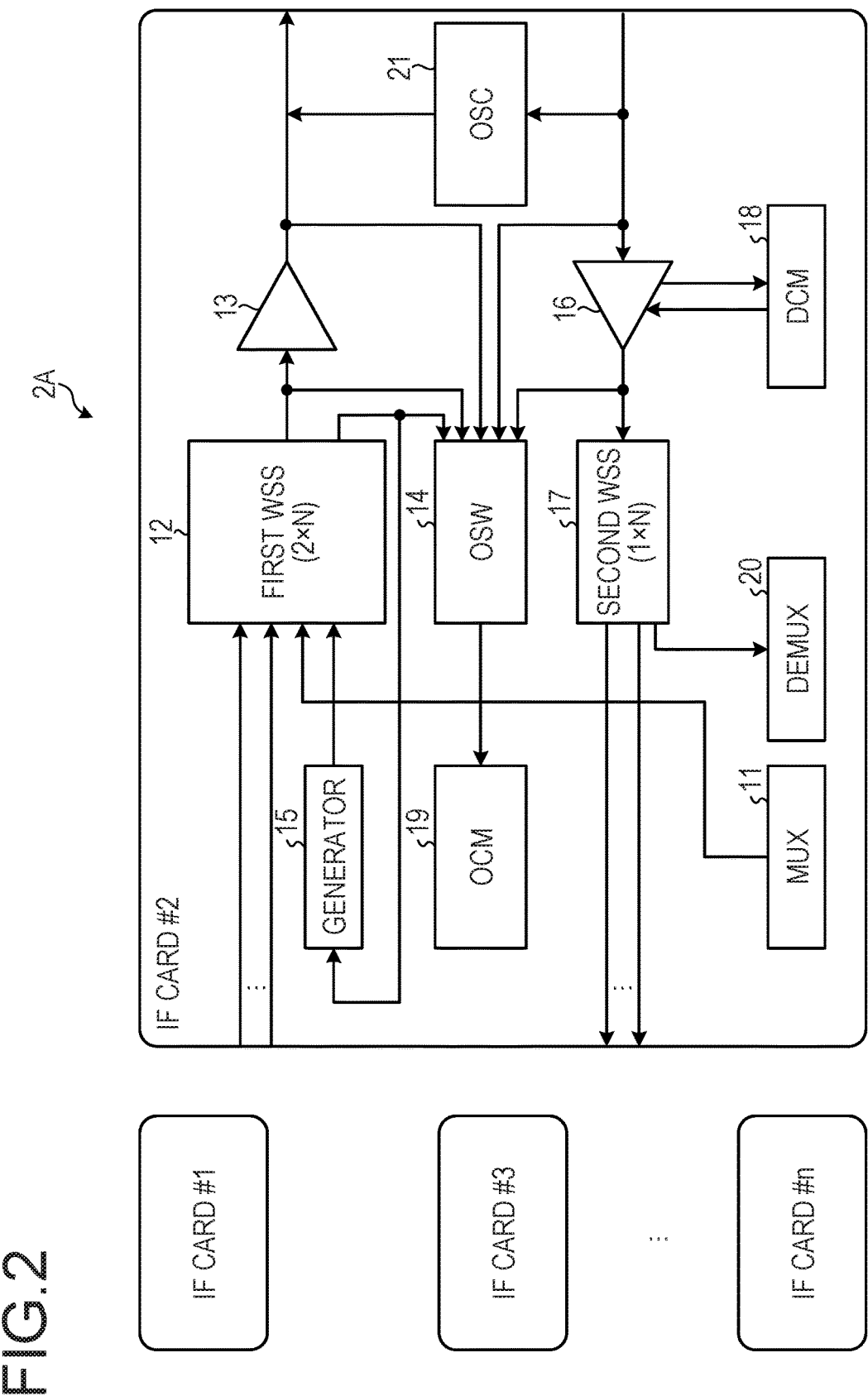
FIG. 2 is a block diagram illustrating one example of an IF card #2 in a first optical transmission apparatus.

FIG. 2 is a block diagram illustrating one example of the IF card #2 in the first optical transmission apparatus 2A. The IF card #2 illustrated in FIG. 2 includes a MUX (Multiplexer) 11, a first WSS (Wavelength Selector Switch) 12, a transmission amplifier 13, an OSW (Optical Switch) 14, and a generator 15. The IF card #2 further includes a reception amplifier 16, a second WSS 17, a DCM (Dispersion Compensation Module) 18, an OCM (Optical Channel Monitor) 19, and a DEMUX (Demultiplexer) 20. The IF card #2 further includes an OSC (Optical Supervisory Channel) 21.

The MUX 11 additionally inputs a new optical signal. The first WSS 12 inputs optical signals having different wavelengths, wavelength-multiplexes the input optical signals having different wavelengths, and outputs an optical signal obtained by the wavelength-multiplexing. The first WSS 12 has N input ports and two output ports. The transmission amplifier 13 amplifies the wavelength-multiplexed optical signal output from the first WSS 12 and outputs the amplified optical signal to the optical fiber 4. The OSW 14 is an optical switch for switching an optical signal input thereto. The generator 15 uses an optical signal having a particular wavelength to generate a probe optical signal to be described later, and outputs the generated probe optical signal to the first WSS 12. The probe optical signal is used to calculate a polarization-dependent evaluation value of PDL, DGD and the like.

The reception amplifier 16 amplifies the wavelength-multiplexed optical signal received from the optical fiber 4. The DCM 18 detects an optical power of each wavelength from the wavelength-multiplexed optical signal and controls an optical amplification factor of the reception amplifier 16 based on the detected optical power of each wavelength. The second WSS 17 separates the wavelength-multiplexed optical signal amplified in the reception amplifier 16 into optical signals having any wavelengths. The second WSS 17 has N output ports and one input port. The DEMUX 20 separates an optical signal having a particular wavelength from the optical signals output from the second WSS 17. The OCM 19 calculates PDL and DGD on a transmission section to be monitored, from a received probe optical signal. The OCM 19 calculates OSNR on the transmission section to be monitored, from the optical power of a received optical signal having a particular wavelength. The OCM 19 notifies a monitoring terminal (not illustrated) of the calculated OSNR, PDL and DGD, for example, through the OSC 21.

Figure 3:
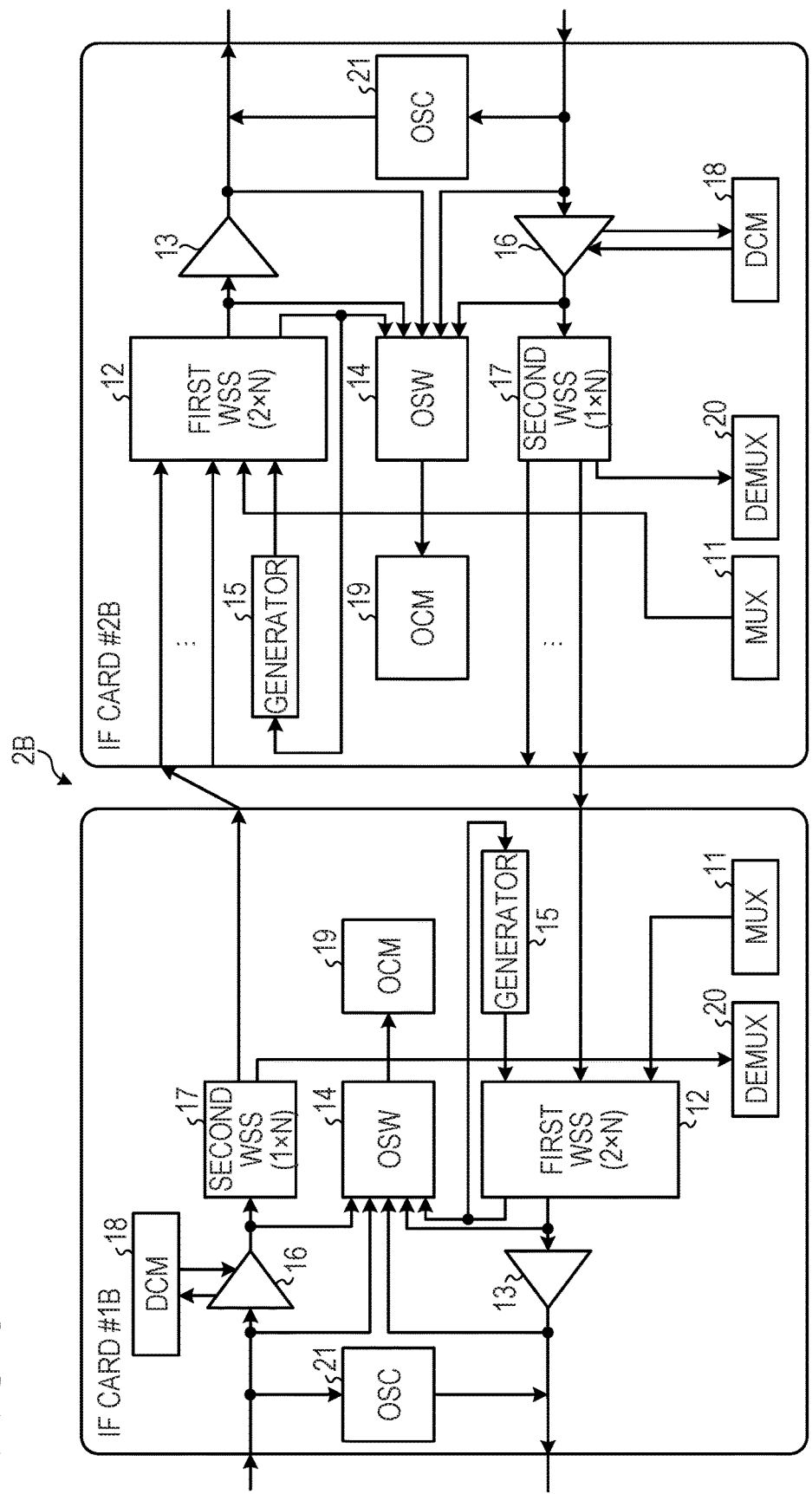
FIG. 3 is a block diagram illustrating one example of IF cards #1B and #2B in a second optical transmission apparatus.

FIG. 3 is a block diagram illustrating one example of IF cards #1B and #2B in the second optical transmission apparatus 2B. For the convenience of description, the same elements as the IF card #2 illustrated in FIG. 2 are denoted by the same reference numerals, and explanations on the configuration and operation thereof will not be repeated. Each of the IF cards #1B and #2B illustrated in FIG. 3 includes a MUX 11, a first WSS 12, a transmission amplifier 13, an OSW 14, and a generator 15. Each of the IF cards #1B and #2B further includes a reception amplifier 16, a second WSS 17, a DCM 18, an OCM 19, a DEMUX 20, and an OSC 21.

The reception amplifier 16 of the IF card #1B is connected to the IF card #2 in the first optical transmission apparatus 2A via the optical fiber 4. The reception amplifier 16 receives a wavelength-multiplexed optical signal from the IF card #2 and amplifies the received optical signal. The transmission amplifier 13 of the IF card #1B is connected to the IF card #2 in the first optical transmission apparatus 2A via the optical fiber 4. The transmission amplifier 13 outputs a wavelength-multiplexed optical signal to the reception amplifier 16 of the IF card #2.

The second WSS 17 in the IF card #1B is connected to the first WSS 12 in the IF card #2B and outputs a wavelength-separated optical signal to the first WSS 12 in the IF card #2B. The transmission amplifier 13 of the IF card #2B is connected to the repeater 3 via the optical fiber 4. The transmission amplifier 13 amplifies an optical signal that is wavelength-multiplexed in the first WSS 12 and outputs the amplified optical signal to the repeater 3.

The reception amplifier 16 of the IF card #2B is connected to the repeater 3 via the optical fiber 4. The reception amplifier 16 amplifies a wavelength-multiplexed optical signal received from the repeater 3 and inputs the amplified optical signal to the second WSS 17. The second WSS 17 in the IF card #2B is connected to the first WSS 12 in the IF card #1B and outputs a wavelength-separated optical signal to the first WSS 12 in the IF card #1B.

Figure 4:
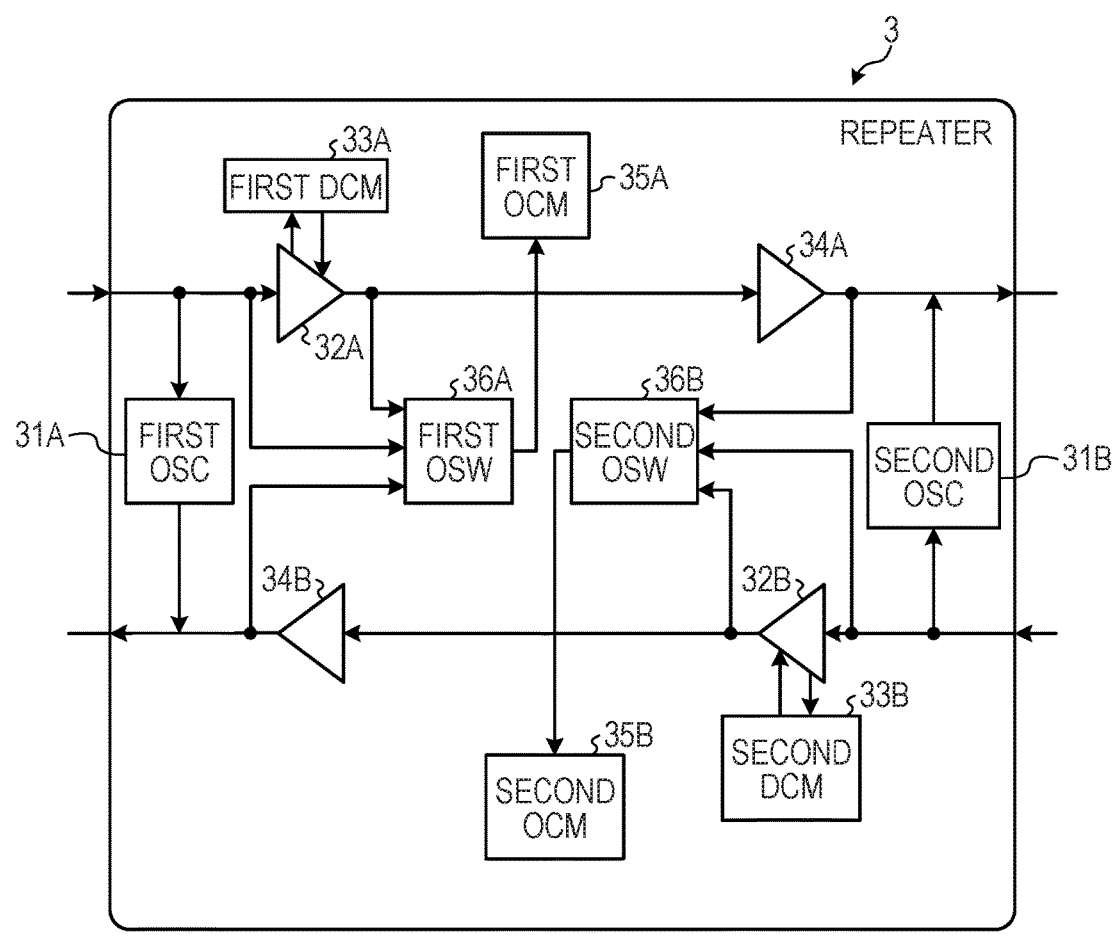
FIG. 4 is a block diagram illustrating one example of a repeater.

FIG. 4 is a block diagram illustrating one example of the repeater 3. The repeater 3 illustrated in FIG. 4 is a repeater for relaying a wavelength-multiplexed optical signal between the second optical transmission apparatus 2B and the third optical transmission apparatus 2C, as illustrated in FIG. 1. The repeater 3 includes a first OSC 31A, a second OSC 31B, a first reception amplifier 32A, a first DCM 33A, a second transmission amplifier 34A, a first OCM 35A, and a first OSW 36A. The repeater 3 further includes a second reception amplifier 32B, a second DCM 33B, a second transmission amplifier 34B, a second OCM 35B, and a second OSW 36B.

The first reception amplifier 32A is connected to the second optical transmission apparatus 2B via the optical fiber 4. The first reception amplifier 32A amplifies a wavelength-multiplexed optical signal received from the second optical transmission apparatus 2B and outputs the amplified optical signal to the first transmission amplifier 34A. The first DCM 33A detects an optical power of each wavelength in the wavelength-multiplexed optical signal received from the second optical transmission apparatus 2B and controls an optical amplification factor of the first reception amplifier 32A based on the detected optical power of each wavelength.

The first transmission amplifier 34A is connected to the third optical transmission apparatus 2C via the optical fiber 4. The first transmission amplifier 34A amplifies the wavelength-multiplexed optical signal amplified in the first reception amplifier 32A and outputs the amplified optical signal to the reception amplifier 16 in the third optical transmission apparatus 2C. The first OCM 35A calculates PDL and DGD based on a probe optical signal optically-branched in the first OSW 36A. The first OCM 35A notifies a monitoring terminal of the calculated PDL and DGD.

The second reception amplifier 32B is connected to the third optical transmission apparatus 2C via the optical fiber 4. The second reception amplifier 32B amplifies a wavelength-multiplexed optical signal received from the third optical transmission apparatus 2C and outputs the amplified optical signal to the second transmission amplifier 34B. The second DCM 33B detects an optical power of each wavelength in the wavelength-multiplexed optical signal received from the third optical transmission apparatus 2C and controls an optical amplification factor of the second reception amplifier 32B based on the detected optical power of each wavelength.

The second transmission amplifier 34B is connected to the second optical transmission apparatus 2B via the optical fiber 4. The second transmission amplifier 34B amplifies the wavelength-multiplexed optical signal amplified in the second reception amplifier 32B and outputs the amplified optical signal to the reception amplifier 16 in the second optical transmission apparatus 2B. The second OCM 35B calculates PDL and DGD based on a probe optical signal optically-branched in the second OSW 36B. The second OCM 35B notifies a monitoring terminal of the calculated PDL and DGD.

Figure 5:
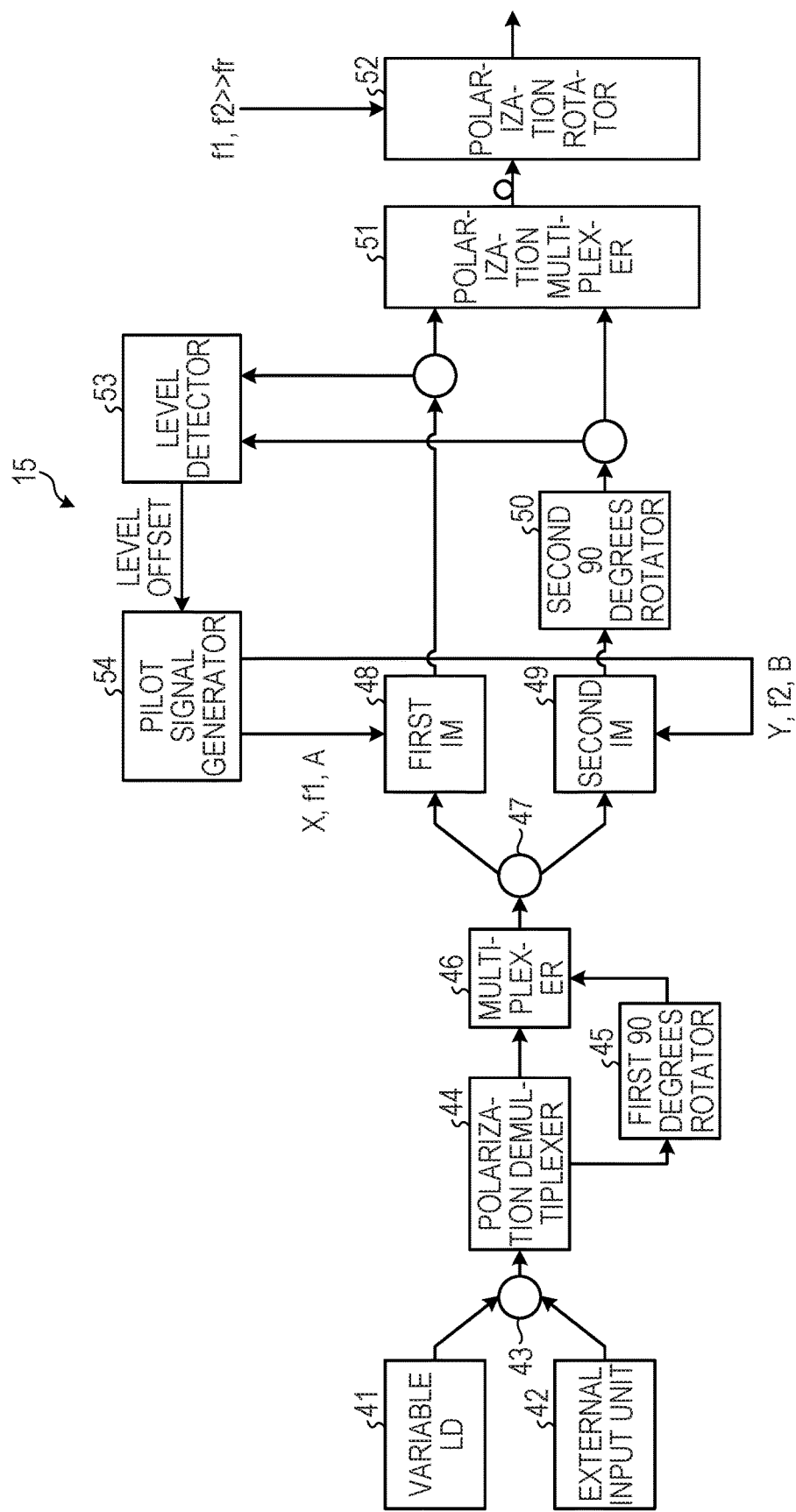
FIG. 5 is a block diagram illustrating one example of a generator of an IF card #2 in the first optical transmission apparatus.

FIG. 5 is a block diagram illustrating one example of the generator 15 of the IF card #2 in the first optical transmission apparatus 2A. Although the generator 15 contained in the IF card #2 in the first optical transmission apparatus 2A is described for the convenience of description, the generator 15 illustrated in FIG. 5 has the same configuration as generators 15 of other IF cards and generators 15 of IF cards of other optical transmission apparatuses 2. Therefore, the same elements are denoted by the same reference numerals, and explanations on the configuration and operation thereof will not be repeated.

The generator 15 illustrated in FIG. 5 includes a variable LD (Laser Diode) 41, an external input unit 42, an optical coupler 43, a polarization demultiplexer 44, a first 90 degrees rotator 45, and a multiplexer 46. The generator 15 further includes an optical splitter 47, a first IM (Intensity Modulator) 48, a second IM 49, a second 90 degrees rotator 50, a polarization multiplexer 51, a polarization rotator 52, a level detector 53, and a pilot signal generator 54. The generator 15 is, for example, a probe generator.

The external input unit 42 is connected to the optical fiber 4 and outputs an optical signal having a wavelength at which an error occurs in the event of an error, to the optical coupler 43. The variable LD 41 outputs an optical signal having a wavelength unused in a normal operation to the optical coupler 43. The polarization demultiplexer 44 separates an optical signal having a particular wavelength of the variable LD 41 or the external input unit 42 received from the optical coupler 43 into two or more linearly-polarized waves (or optical signals) and outputs the linearly-polarized waves to the multiplexer 46 and the first 90 degrees rotator 45. The polarization demultiplexer 44 is, for example, a demultiplexer. The first 90 degrees rotator 45 rotates the linearly-polarized waves by 90 degrees and outputs the rotated linearly-polarized waves to the multiplexer 46. The multiplexer 46 combines the linearly-polarized waves received from the polarization demultiplexer 44 and the rotated linearly-polarized waves received from the first 90 degrees rotator 45, and outputs the combined linearly-polarized waves to the optical splitter 47, with polarization directions thereof aligned to the same polarization direction. The first 90 degrees rotator 45 and the multiplexer 46 are, for example, a first adjustor. The polarization demultiplexer 44, the first 90 degrees rotator 45, and the multiplexer 46 correct a polarization direction of an optical signal to a particular direction, and can stabilize an output by aligning any polarization directions of input optical signals to the same polarization direction.

The optical splitter 47 splits the optical signal received from the multiplexer 46 and outputs optical signals obtained by the splitting to the first IM 48 and the second IM 49. The optical splitter 47, the first IM 48, and the second IM 49 are, for example, a modulator. The pilot signal generator 54 generates a first pilot signal f1 and a second pilot signal f2 used to intensity-modulate the optical signal split in the optical splitter 47. A pilot signal refers to a low frequency signal which is sufficiently slower than a main optical signal.

The first IM 48 intensity-modulates the optical signal split in the optical splitter 47 with the first pilot signal f1 received from the pilot signal generator 54 and outputs the optical signal intensity-modulated with the first pilot signal f1 to the polarization multiplexer 51. The optical signal intensity-modulated with the first pilot signal f1 superimposes a pattern of PATH ID "A" with a CDMA code "X" to be described later. The second IM 49 intensity-modulates the optical signal split in the optical splitter 47 with the second pilot signal f2 received from the pilot signal generator 54 and outputs the optical signal intensity-modulated with the second pilot signal f2 to the second 90 degrees rotator 50. The optical signal intensity-modulated with the second pilot signal f2 superimposes a pattern of PATH ID "B" with a CDMA code "Y."

The second 90 degrees rotator 50 rotates the optical signal intensity-modulated in the second IM 49 by 90 degrees and outputs the 90 degrees-rotated optical signal to the polarization multiplexer 51. The second 90 degrees rotator 50 is, for example, a second adjustor. The polarization multiplexer 51 polarization-combines the optical signal intensity-modulated in the first IM 48 and the intensity-modulated optical signal 90 degrees-rotated in the second 90 degrees rotator 50, and outputs an optical signal obtained by the polarization-combination to the polarization rotator 52. The polarization rotator 52 uses a frequency fr lower than the frequency of the pilot signal to rotate the optical signal from the polarization multiplexer 51 between 0 degree and 90 degrees, thereby producing a probe optical signal. The polarization multiplexer 51 and the polarization rotator 52 are, for example, an output unit. As a result, the generator 15 outputs a probe optical signal including the first pilot signal f1 and the second pilot signal f2 that can be calculated in the OCM 19 side by PDL and DGD.

The level detector 53 controls the pilot signal generator 54 that generates the pilot signal to be input to the first IM 48 and the second IM 49 such that an output level of the optical signal intensity-modulated in the first IM 48 becomes equal to that of the optical signal intensity-modulated in the second IM 49.

Figure 6:
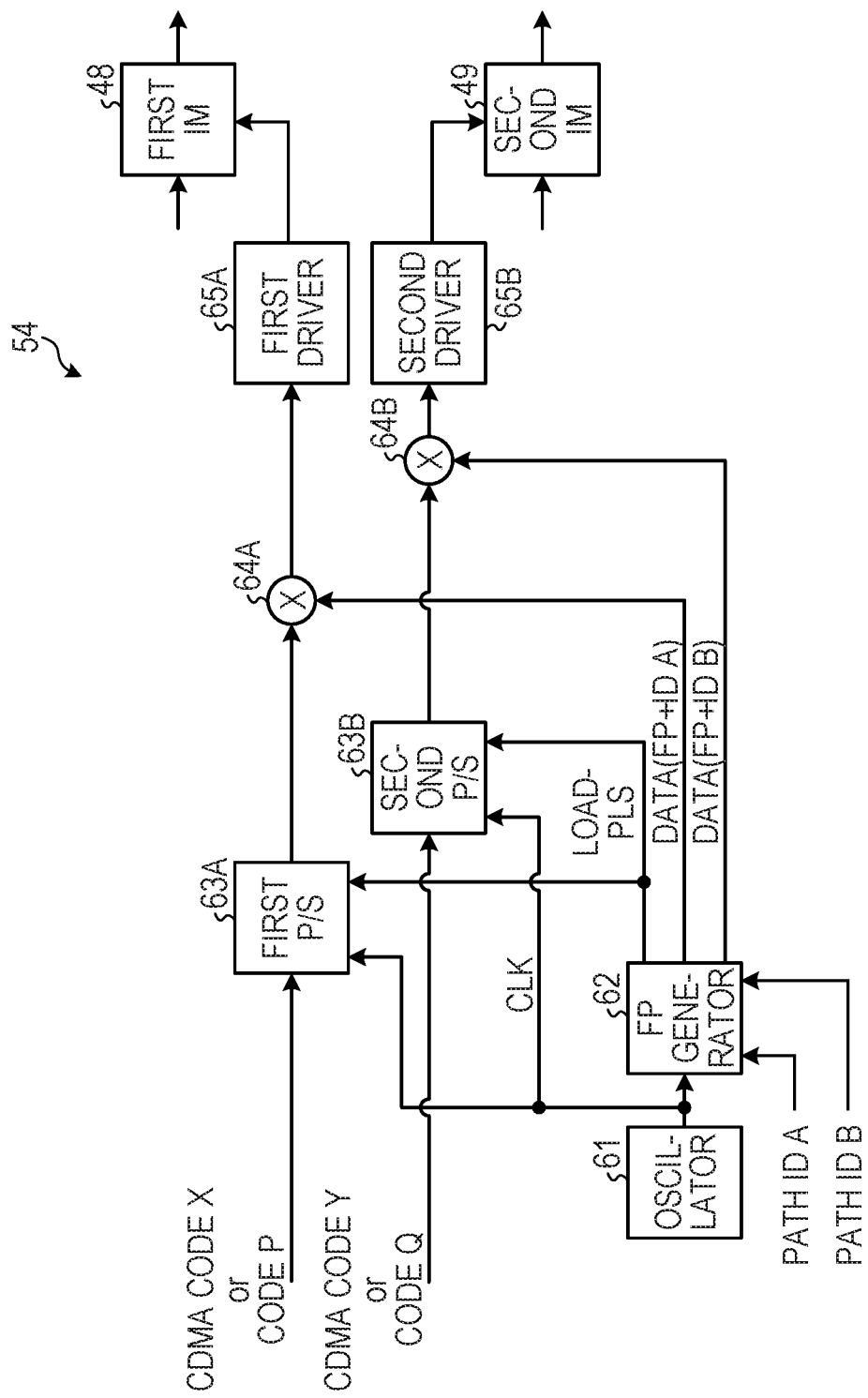
FIG. 6 is a block diagram illustrating one example of a pilot signal generator illustrated in FIG. 5.

FIG. 6 is a block diagram illustrating one example of the pilot signal generator 54 illustrated in FIG. 5. The pilot signal generator 54 illustrated in FIG. 6 includes an oscillator 61, an FP generator 62, a first P/S (Parallel/Serial) 63A, a first multiplier 64A, and a first driver 65A. The pilot signal generator 54 further includes a second P/S 63B, a second multiplier 64B, and a second driver 65B. The pilot signal generator 54 is, for example, a generator. The oscillator 61 oscillates a clock signal CK having a predetermined frequency. Based on the clock signal CK from the oscillator 61, the FP (Frame Pulse) generator 62 generates a pulse signal superimposing the pattern of PATH ID "A" while generating a pulse signal superimposing the pattern of PATH ID "B." The PATH ID is an ID identifying a transmission section to be monitored. The first P/S 63A serializes the CDMA (Code Division Multiple Access) code of parallel data encoding the PATH ID "A" based on the clock signal CK from the oscillator 61. In addition, the first P/S 63A outputs the CDMA code "X" of the serial bit string to the first multiplier 64A.

The first multiplier 64A multiplies the CDMA code "X" of the serial bit string received from the first P/S 63A, the pattern of PATH ID "A" and the pulse signal. Then, the first multiplier 64A generates the first pilot signal f1 superimposing the pattern of PATH ID "A" encoded with the CDMA code "X." Based on the first pilot signal f1 generated in the first multiplier 64A, the first driver 65A controls the driving of the first IM 48 to intensity-modulate the optical signal optically-branched in the optical splitter 47.

The second P/S 63B serializes the CDMA code "Y" of parallel data encoding the pattern of the PATH ID "B" based on the clock signal CK received from the oscillator 61 and outputs the CDMA code "Y" of the serial bit string to the second multiplier 64B. The second multiplier 64B multiplies the CDMA code "Y" of the serial bit string received from the second P/S 63B, the pattern of PATH ID "B," and the pulse signal. Then, the second multiplier 64B generates the second pilot signal f2 superimposing the pattern of PATH ID "B" encoded with the CDMA code "Y." Based on the second pilot signal f2 generated in the second multiplier 64B, the second driver 65B controls the driving of the second IM 49 to intensity-modulate the optical signal optically-branched in the optical splitter 47.

Figure 7:
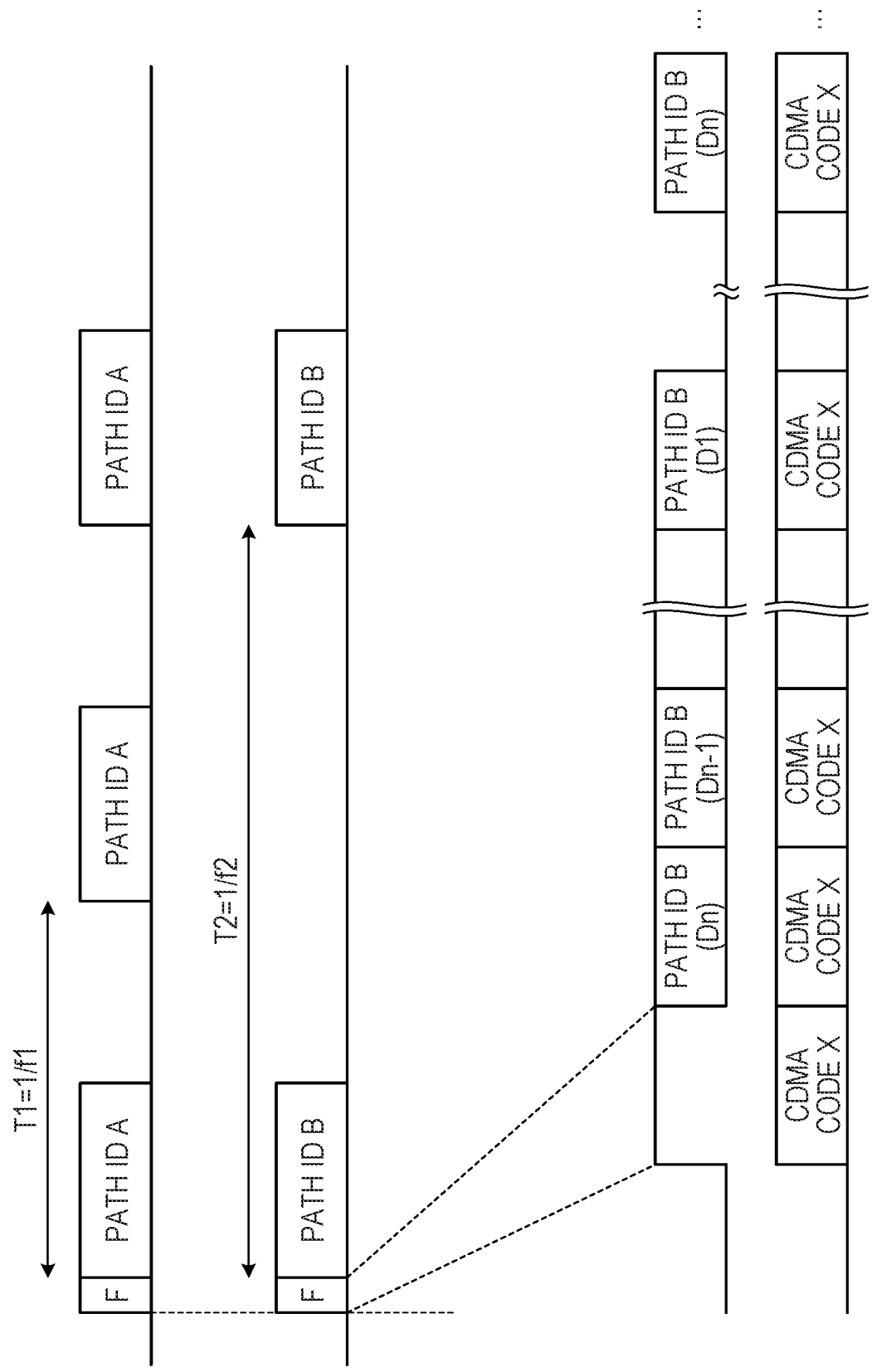
FIG. 7 is an explanatory view illustrating one example of output timings of pilot signals.

FIG. 7 is an explanatory view illustrating one example of output timings of the pilot signals. A timing period T1 of the first pilot signal f1 of the PATH ID "A" illustrated in FIG. 7 is 1/f1, whereas a timing period T2 of the second pilot signal f2 of the PATH ID "B" is 1/f2. Each of the first pilot signal f1 and the second pilot signal f2 has a head pattern F arranged in its header. In order to measure the DGD, the first pilot signal f1 and the second pilot signal f2 are output at the same timing from their respective head patterns F. Thereafter, the first pilot signal f1 is sequentially output with the timing period T1. The second pilot signal f2 is sequentially output with the timing period T2.

Figure 8:
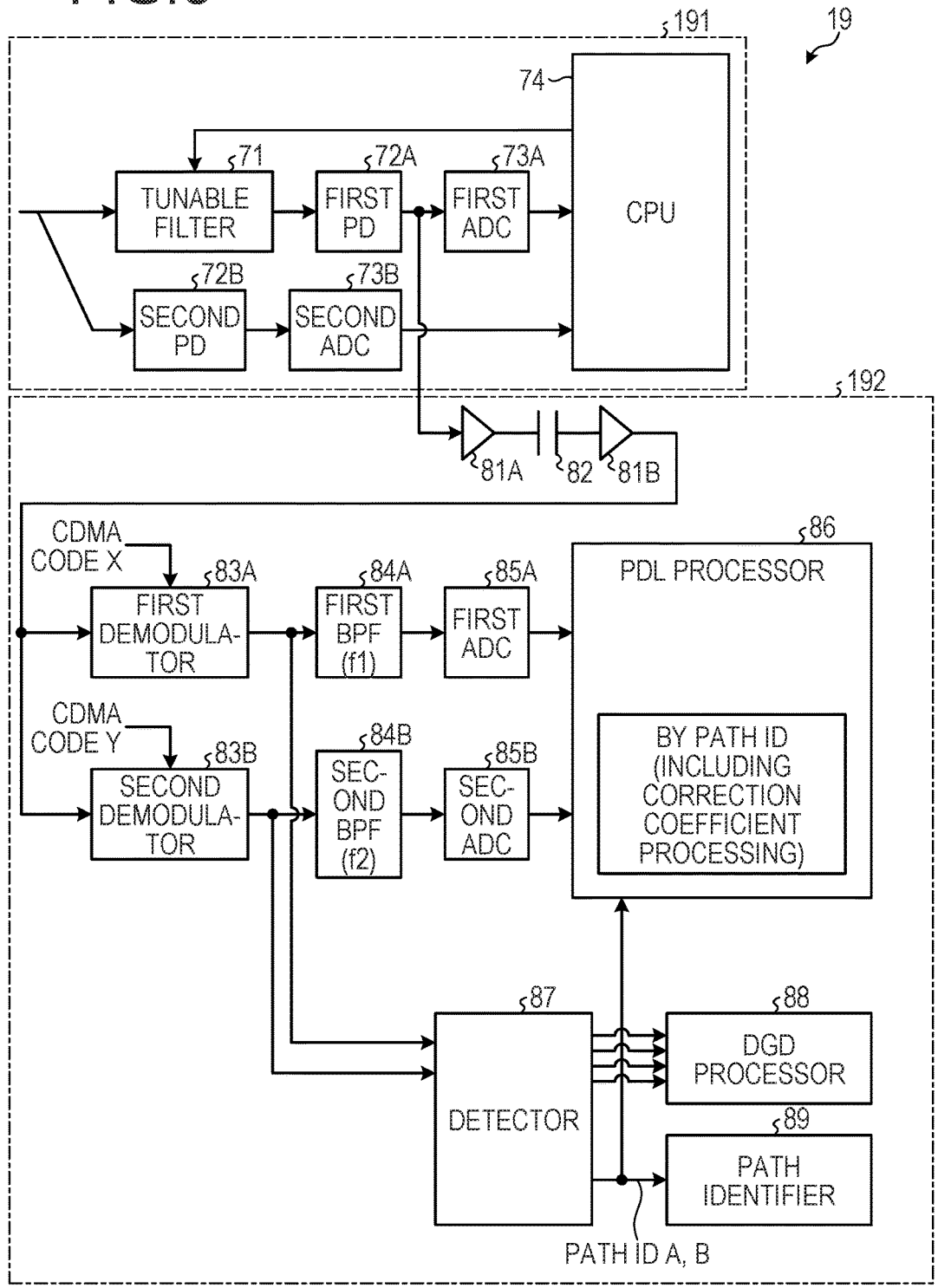
FIG. 8 is a block diagram illustrating one example of an OCM in the first optical transmission apparatus.

FIG. 8 is a block diagram illustrating one internal configuration example of the OCM 19 in the first optical transmission apparatus 2A. Although the OCM 19 contained in the IF card #2 in the first optical transmission apparatus 2A is described for the convenience of description, the OCM 19 illustrated in FIG. 8 has the same configuration as OCMs 19 of other IF cards and OCMs 19 of other optical transmission apparatuses 2. Therefore, the same elements are denoted by the same reference numerals, and explanations on the configuration and operation thereof will not be repeated. In addition, since the first OCM 35A and second OCM 35B in the repeater 3 have the same configuration as the OCM 19, explanations thereof will not be repeated.

The OCM 19 illustrated in FIG. 8 includes a first monitor 191 and a second monitor 192. Based on the optical power of the corresponding wavelength optical signal of wavelength-multiplexed optical signals and the optical power of the wavelength-multiplexed optical signals, the first monitor 191 calculates OSNR of the corresponding wavelength optical signal. The first monitor 191 includes a tunable filter 71, a first PD (Photo Diode) 72A, a second PD 72B, a first ADC (Analog/Digital Converter) 73A, a second ADC 73B, and a CPU (Central Processing Unit) 74. The tunable filter 71 extracts an optical signal having a relevant wavelength from the wavelength-multiplexed optical signals. The first PD 72A detects the optical power in an electric signal obtained by an electrical conversion of the optical signal extracted by the tunable filter 71. The first ADC 73A converts the optical power detected by the first PD 72A into a digital value. The second PD 72B detects the optical power in an electric signal obtained by an electrical conversion of the wavelength-multiplexed optical signals. The second ADC 73B converts the optical power detected by the second PD 72B into a digital value. Based on the digital value obtained by the first ADC 73A and the digital value obtained by the second ADC 73B, the CPU 74 calculates OSNR for each optical wavelength.

The second monitor 192 calculates PDL and DGD on the transmission section from the probe optical signal. The second monitor 192 includes a pre-amplifier 81A, a capacitor 82, a post-amplifier 81B, a first demodulator 83A, a first BPF (Band Pass Filter) 84A, and a first ADC 85A. The second monitor 192 further includes a second demodulator 83B, a second BPF 84B, a second ADC 85B, a PDL processor 86, a detector 87, a DGD processor 88, and a path identifier 89. The pre-amplifier 81A amplifies the electric signal of the optical signal, which is obtained by an electrical conversion by the first PD 72A. The capacitor 82 cuts a noise component from the amplified electric signal. The post-amplifier 81B amplifies a noise-free electric signal.

The first demodulator 83A uses the CDMA code "X" to demodulate the pattern of PATH ID "A" and the pulse signal component from the electric signal amplified by the post-amplifier 81B. The first BPF 84A extracts the first pilot signal f1 from the demodulated pulse signal component. The first demodulator 83A and the first BPF 84A are, for example, an extractor. The first ADC 85A converts the first pilot signal f1 extracted by the first BPF 84A into a digital value.

The second demodulator 83B uses the CDMA code "Y" to demodulate the pattern of PATH ID "B" and the pulse signal component from the electric signal amplified by the post-amplifier 81B. The second BPF 84B extracts the second pilot signal f2 from the demodulated pulse signal component. The second demodulator 83B and the second BPF 84B are, for example, an extractor. The second ADC 85B converts the second pilot signal f2 extracted by the second BPF 84B into a digital value.

The PDL processor 86 calculates PDL based on the digital value obtained in the first ADC 85A and the digital value obtained in the second ADC 85B. Since the intensity of the pilot signals varies depending on the pattern of the PATH ID, the PDL processor 86 performs a correction process according to the pattern. The PDL processor 86 is, for example, a calculator. The detector 87 detects the head pattern F of PATH ID "A" and the head pattern F of PATH ID "B." The DGD processor 88 calculates a delay difference which is a difference between the head pattern F of PATH ID "A" and the head pattern F of PATH ID "B." The DGD processor 88 calculates the DGD based on the calculated delay difference, the first pilot signal f1, and the second pilot signal f2. The DGD processor 88 is, for example, a calculator. The path identifier 89 identifies the PATH IDs of the pilot signals f1 and f2 through the detector 87.

Figure 9:
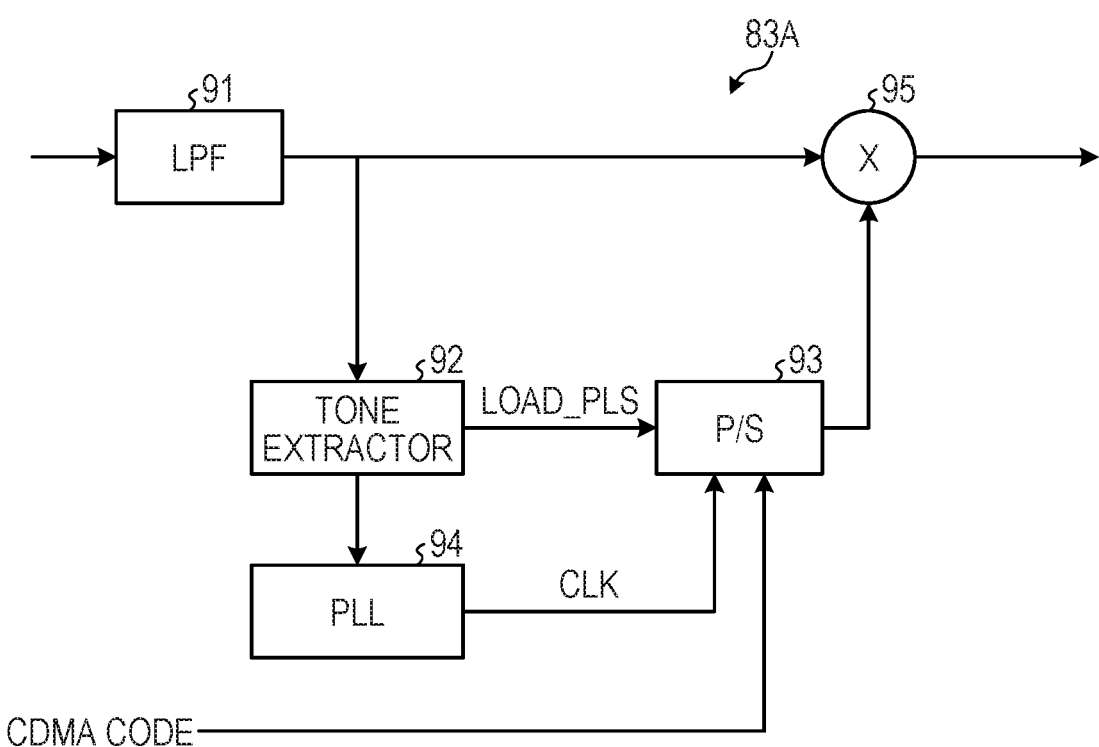
FIG. 9 is a block diagram illustrating one example of a first demodulator illustrated in FIG. 8.

FIG. 9 is a block diagram illustrating one example of the first demodulator 83A illustrated in FIG. 8. In addition, the second demodulator 83B has substantially the same configuration as the first demodulator 83A. Therefore, the same elements are denoted by the same reference numerals, and explanations on the configuration and operation thereof will not be repeated. The first demodulator 83A illustrated in FIG. 9 includes an LPF (Low Pass Filter) 91, a tone extractor 92, a P/S 93, a PLL (Phase Locked Loop) 94 and a multiplier 95. The LPF 91 extracts a low frequency component corresponding to a pilot signal from the electric signal of the post-amplifier 81B. The tone extractor 92 extracts the timing of the sequentially-extracted low frequency component. The PLL 94 outputs a clock signal of the pilot signal in synchronization with the timing of the low frequency component extracted by the tone extractor 92. The P/S 93 converts the CDMA code to be demodulated into a serial bit string based on the clock signal from the PLL 94 and inputs the obtained serial bit string of the CDMA code to the multiplier 95. Based on the CDMA code, the multiplier 95 demodulates the pattern of the PATH ID and the pulse signal component from the signal component extracted by the LPF 91.

Figure 10:
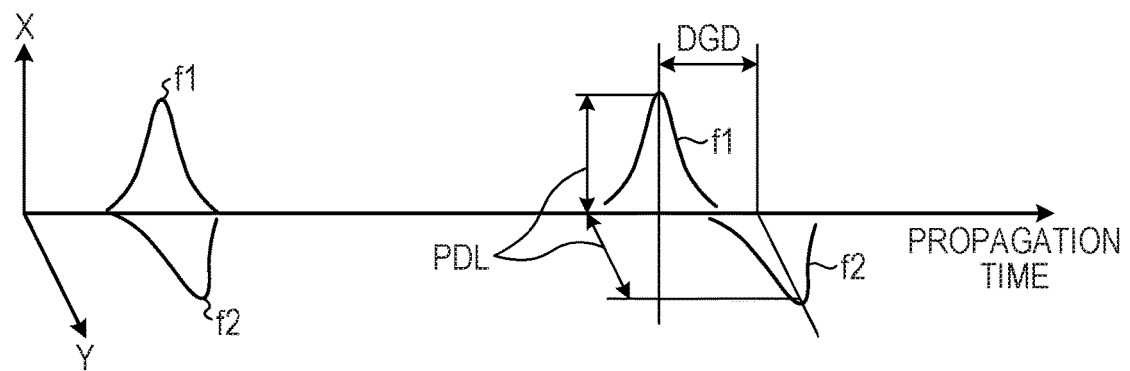
FIG. 10 is an explanatory view illustrating one example of a method for measuring PDL and DGD.

FIG. 10 is an explanatory view illustrating one example of a method for measuring the PDL and DGD. In FIG. 10, the X axis represents the first pilot signal f1 of the PATH ID "A" and the Y axis represents the second pilot signal f2 of the PATH ID "B." The PDL processor 86 can calculate PDL based on the maximum amplitude of the first pilot signal f1 and the maximum amplitude of the second pilot signal f2. The DGD processor 88 calculates DGD based on a temporal difference between the maximum amplitude of the first pilot signal f1 and the maximum amplitude of the second pilot signal f2.

The generator 15 of the First Embodiment separates an input optical signal into polarized optical signals, combines the polarized optical signals with polarization directions thereof aligned to the same polarization direction, optically branches the combined optical signals, and intensity-modulates the branched optical signals with their respective pilot signals. In addition, the generator 15 combines the intensity-modulated polarized optical signals with different polarization directions to generate a probe optical signal. As a result, the generator 15 can output a probe optical signal to allow measurement of polarization-dependent evaluation values of PDL, DGD and the like.

The OCM 19 extracts the first pilot signal f1 and the second pilot signal f2 from the probe optical signal and calculates PDL and DGD based on the extracted pilot signals. As a result, even if a variety of modulation schemes are mixed, the OCM 19 can use the pilot signals in the probe optical signal to calculate PDL and DGD on the transmission section.

The OCM 19 can check whether or not the probe optical signal is actually passing through a scheduled section of the PATH ID in the optical transmission system 1, by identifying the PATH ID of each pilot signal in the probe optical signal. As a result, it is possible to check whether there exists a connection error in the optical fiber 4. In addition, the OCM 19 can use the first pilot signal f1 and the second pilot signal f2 in the probe optical signal to calculate PDL and DGD which are the cause of signal deterioration in the transmission section.

The generator 15 exemplifies the optical coupler 43 that optically couples the variable LD 41 and the external input unit 42. The generator 15 receives an optical signal having a wavelength at which an error occurs in the event of an error, as a probe optical signal, from the external input unit 42, while receiving an optical signal having a wavelength unused in the normal operation from the variable LD 41. Upon receiving the optical signal having the wavelength at which the error occurs from the external input unit 42, the generator 15 uses the optical signal having the wavelength at which the error occurs in the event of an error to generate the probe optical signal. As a result, the OCM 19 can use the probe optical signal to calculate PDL and DGD of the wavelength at which the error occurs.

Upon receiving the optical signal having the wavelength unused in the normal operation from the variable LD 41, the generator 15 uses the optical signal having the unused wavelength to generate the probe optical signal. As a result, the OCM 19 can use the probe optical signal to calculate PDL and DGD on the transmission section.

Figure 11:
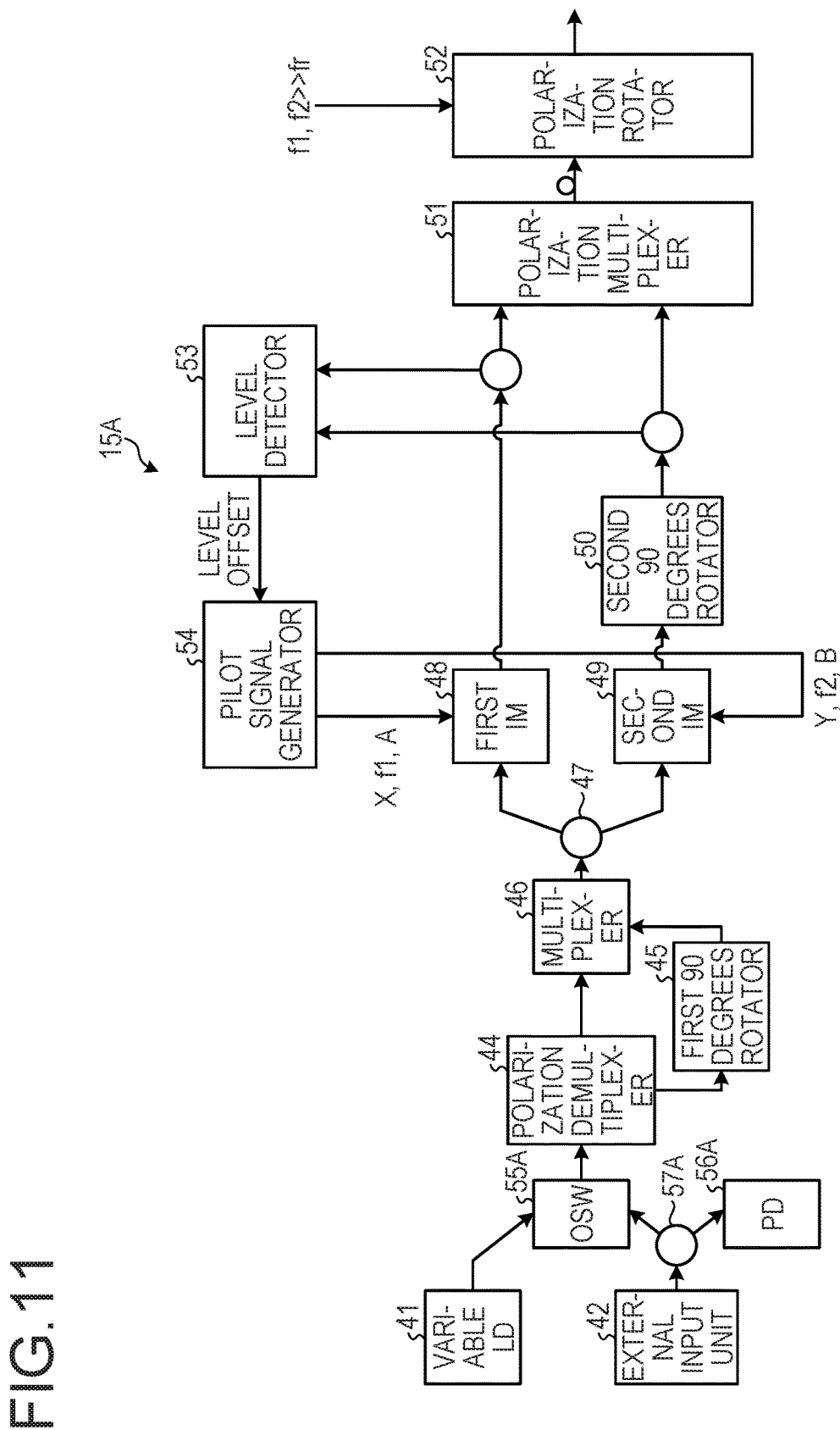
FIG. 11 is a block diagram illustrating one example of another generator.

When receiving the optical signal from the external input unit 42, it is necessary for the generator 15 of the First Embodiment to make the variable LD 41 be turned OFF in order to stop the optical signal from the variable LD 41. However, in some cases, the generator 15 may not have the function of making the variable LD 41 to be turn ON/OFF. Therefore, in order to cope with such cases, a generator 15A to be described below may be provided. FIG. 11 is a block diagram illustrating one example of another generator 15A. The generator 15A illustrated in FIG. 11 includes an OSW 55A for switching optical signals received from the variable LD 41 and the external input unit 42, instead of the optical coupler 43. The generator 15A further includes an optical coupler 57A for optically coupling an optical signal received from the external input unit 42 having a wavelength at which an error occurs to a PD 56A and the OSW 55A. The PD 56A detects whether there exists an optical signal having the wavelength at which the error occurs among the optical signals received from the external input unit 42. When the PD 56A detects the optical signal having the wavelength at which the error occurs in the optical signal received from the external input unit 42, the OSW 55A outputs the optical signal received from the external input unit 42 having the wavelength at which the error occurs to the polarization demultiplexer 44.

Upon detecting the optical signal from the external input unit 42 when the variable LD 41 is turned ON, the generator 15A illustrated in FIG. 11 can switch the optical signal from the external input unit 42 through the OSW 55A to output the optical signal. Therefore, the generator 15 may not have the function of making the variable LD 41 to be turn ON/OFF.

Figure 12:
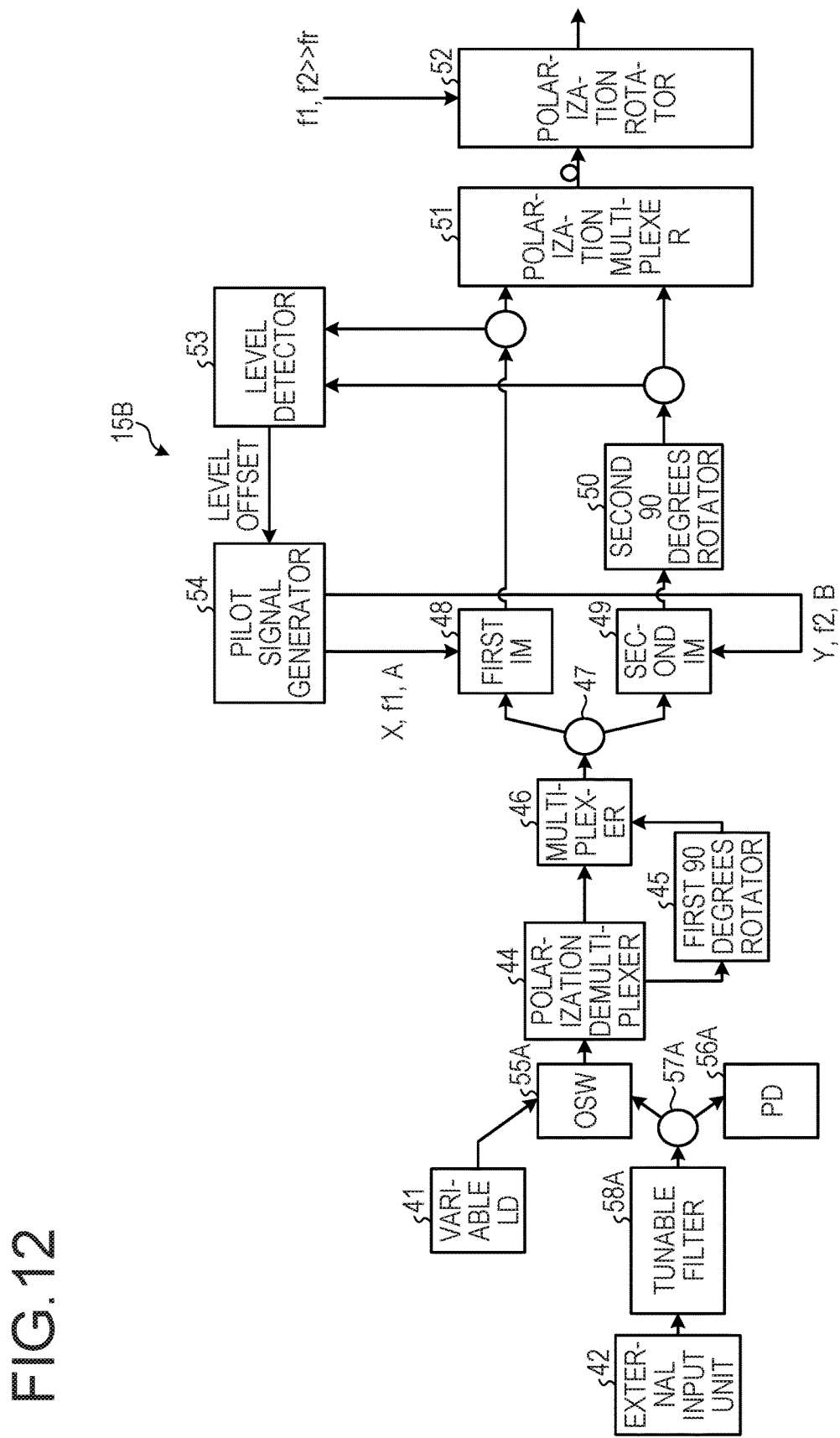
FIG. 12 is a block diagram illustrating one example of still another generator.

FIG. 12 is a block diagram illustrating one example of still another generator 15B. For the convenience of description, the same elements as the generator 15A illustrated in FIG. 11 are denoted by the same reference numerals, and explanations on the configuration and operation thereof will not be repeated. The generator 15B illustrated in FIG. 12 includes a tunable filter 58A interposed between the external input unit 42 and the optical coupler 57A. The tunable filter 58A extracts an optical signal having a wavelength at which an error occurs from a wavelength-multiplexed optical signal received from the external input unit 42. The PD 56A detects the optical signal having the wavelength at which the error occurs among the optical signal received from the tunable filter 58A. When the PD 56A detects the optical signal having the wavelength at which the error occurs among the optical signal received from the external input unit 42, the OSW 55A outputs the optical signal having the wavelength at which the error occurs received from the external input unit 42 to the polarization demultiplexer 44.

The generator 15B illustrated in FIG. 12 can extract an optical signal having a wavelength at which an error occurs from a WDM wavelength-multiplexed optical signal through the tunable filter 58A and can use the extracted optical signal in which the error occurs to generate a probe optical signal.

Figure 13:
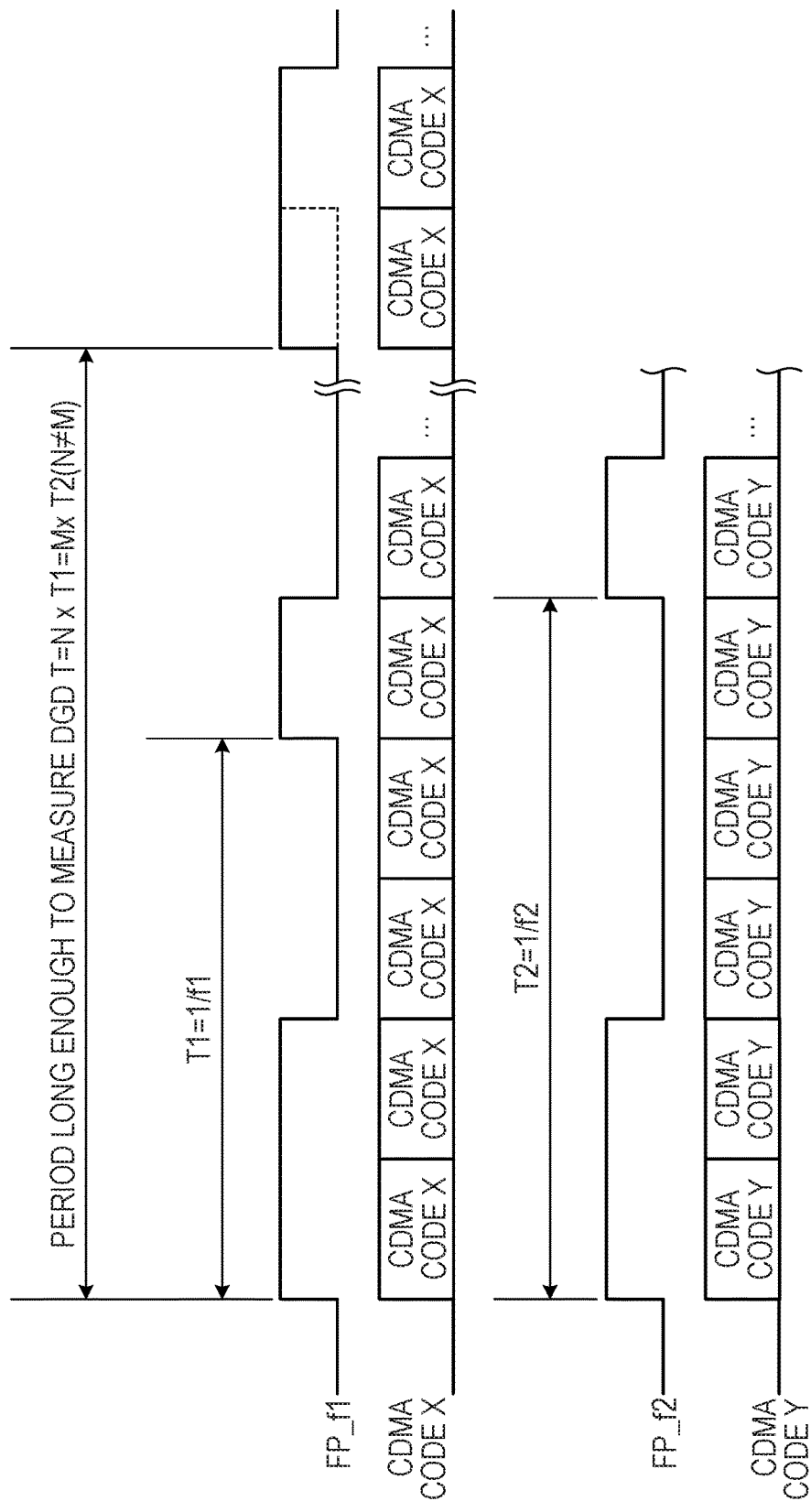
FIG. 13 is an explanatory view illustrating one example of output timings of pilot signals.

In the First Embodiment, as illustrated in FIG. 7, the head patterns F are respectively located at the beginning output timings of the first pilot signal f1 of the PATH ID "A" and the second pilot signal f2 of the PATH ID "B." However, the head patterns F may not be arranged, but instead of the head patterns F, two pulse signals may be used from the beginning of a pulse signal of the pattern of the PATH ID "A." FIG. 13 is an explanatory view illustrating one example of output timings of pilot signals. In FIG. 13, the timing period of the first pilot signal f1 of the PATH ID "A" is assumed as T1 (=1/f1) and the timing period of the second pilot signal f2 of the PATH ID "B" is assumed as T2 (=1/f2). The beginning two pulse signals in the first pilot signal f1 and the second pilot signal f2 are used as head patterns. The beginning two pulse signals in the first pilot signal f1 and the second pilot signal f2 are output at the same timing. Thereafter, the first pilot signal f1 is sequentially output with the timing period T1 and the second pilot signal f2 is sequentially output with the timing period T2. When the first pilot signal f1 illustrated in FIG. 13 is output with the timing period T1 and the second pilot signal f2 is output with the timing period T2, if a period (N×T1=M×T2, where N≠M) taken until the DGD can be calculated is secured, the DGD can be calculated at the OCM 19 side even when the head patterns F are not located.

Although it is illustrated in the First Embodiment that the frequency f1 of the first pilot signal is different from the frequency f2 of the second pilot signal, these signals may have the same frequency.

Although it is illustrated in the First Embodiment that the optical signals from the polarization demultiplexer 44 and the 90 degrees-rotated optical signals from the first 90 degrees rotator 45 are adjusted by the first adjustor, the optical signals from the polarization demultiplexer 44 may be rotated by 45 degrees such that optical signals have the same polarization direction.

In the First Embodiment, the optical signal from the first IM 48 and the optical signal obtained by rotating the optical signal from the second IM 49 at the second 90 degrees rotator 50 are adjusted by the second adjustor. However, the second 90 degrees rotator 50 may be located at the post stage of the first IM 48 instead of the post stage of the second IM 49, and the optical signal from the first IM 48, which is rotated by the second 90 degrees rotator 50, and the optical signal from the second IM 49 may be adjusted by the second adjustor. In addition, both of the optical signals may be adjusted such that the optical signal from the first IM 48 is different in polarization direction from the optical signal from the second IM 49.

Figure 14:
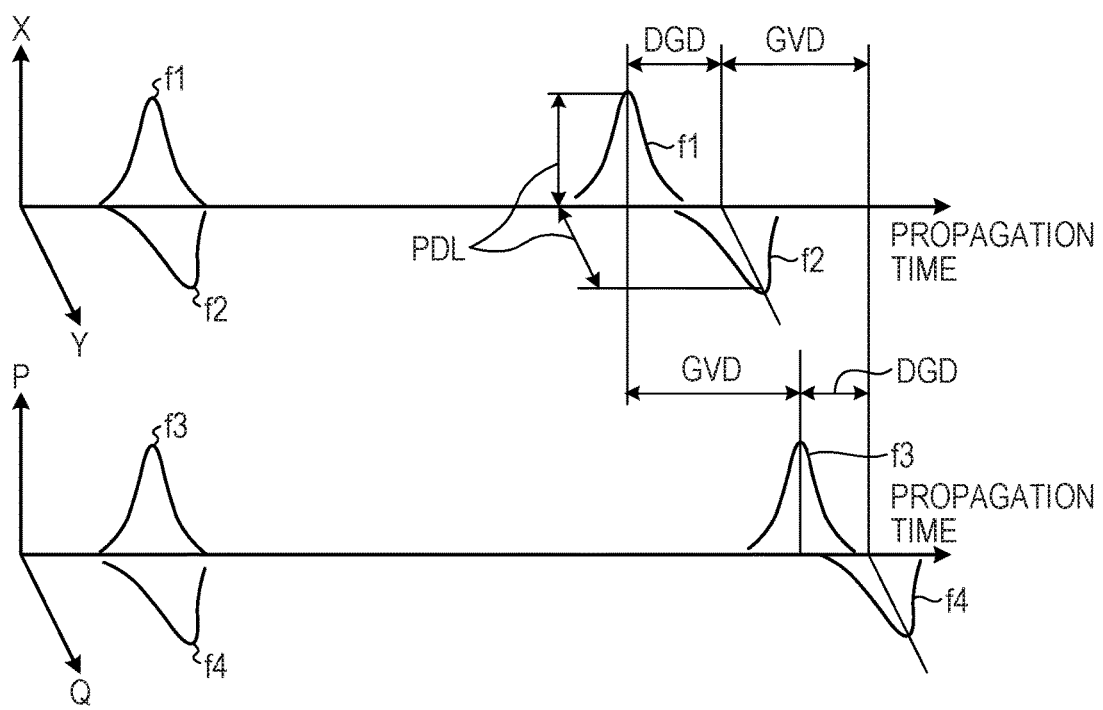
FIG. 14 is an explanatory view illustrating one example of a method for measuring PDL, DGD and GVD.

The second monitor 192 of the First Embodiment is set to calculate the PDL and DGD from the probe optical signal but cannot calculate the GVD (Group Velocity Dispersion). FIG. 14 is an explanatory view illustrating one example of a method for measuring the PDL, DGD and GVD. In FIG. 14, the X axis represents the first pilot signal f1 of the PATH ID "A," the Y axis represents the second pilot signal f2 of the PATH ID "B," the P axis represents the third pilot signal f3 of the PATH ID "C," and the Q axis represents the fourth pilot signal f4 of the PATH ID "D." The GVD is obtained based on a delay difference between a timing of the maximum amplitude of the first pilot signal f1 and a timing of the maximum amplitude of the third pilot signal f3. The GVD is obtained based on a delay difference between a timing of the maximum amplitude of the second pilot signal f2 and a timing of the maximum amplitude of the fourth pilot signal f4. That is, there is a need to use two optical signals having different wavelengths to secure four pilot signals. Therefore, Second Embodiment capable of calculating GVD on the transmission section will be described below.

Second Embodiment

Figure 15:
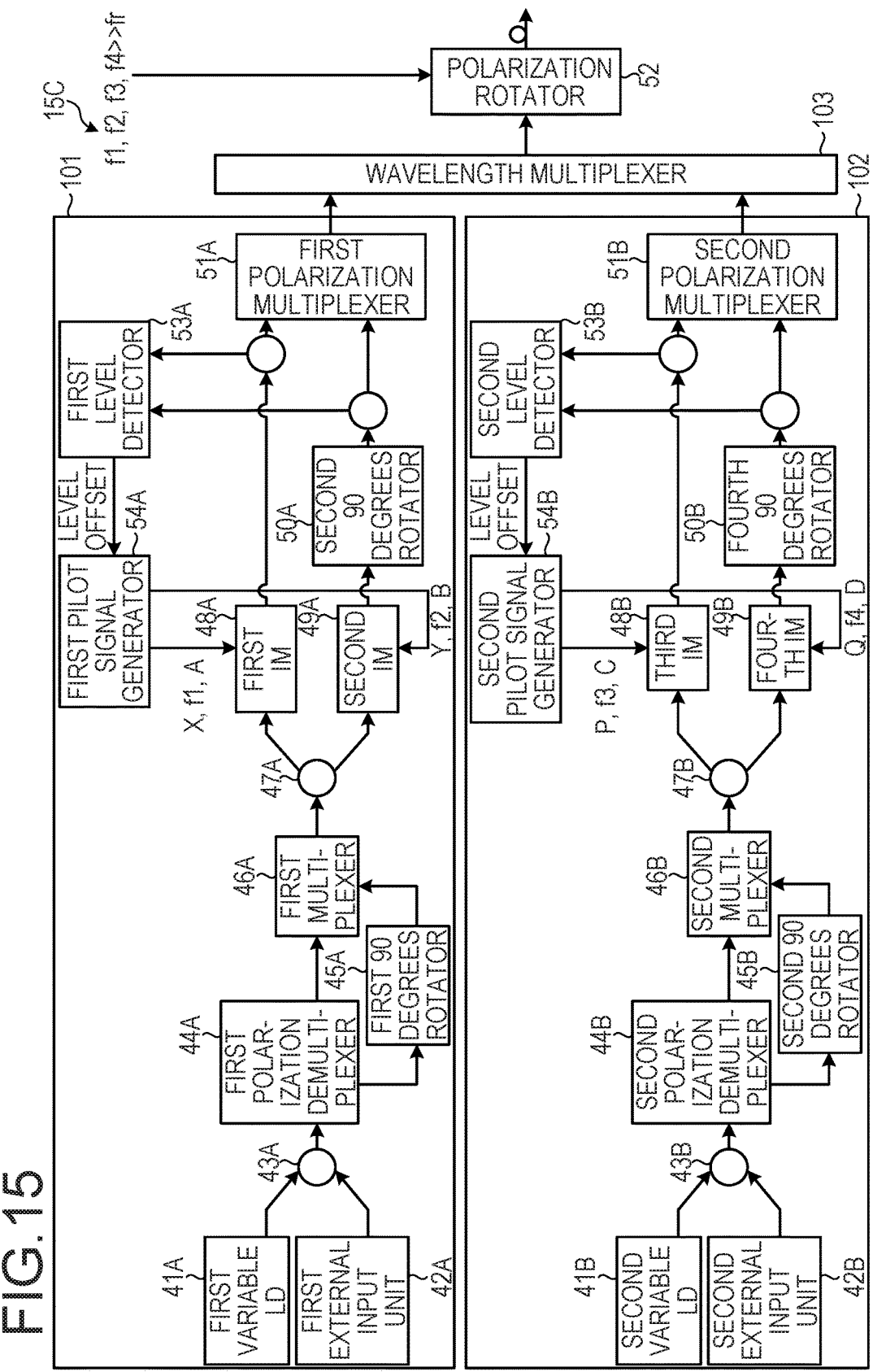
FIG. 15 is a block diagram illustrating one example of a generator of Second Embodiment.

FIG. 15 is a block diagram illustrating one example of a generator 15C of Second Embodiment. For the convenience of description, the same elements as the generator 15 illustrated in FIG. 5 are denoted by the same reference numerals, and explanations on the configuration and operation thereof will not be repeated. The generator 15C illustrated in FIG. 15 includes a first generator 101, a second generator 102, a wavelength multiplexer 103, and a polarization rotator 52. The first generator 101 and the second generator 102 use two different wavelengths to generate a probe optical signal.

The first generator 101 includes a first variable LD 41A, a first external input unit 42A, a first optical coupler 43A, a first polarization demultiplexer 44A, a first 90 degrees rotator 45A, and a first multiplexer 46A. The first generator 101 further includes a second optical splitter 47A, a first IM 48A, a second IM 49A, a second 90 degrees rotator 50A, a first polarization multiplexer 51A, a first level detector 53A, and a first pilot signal generator 54A.

The first external input unit 42A outputs an optical signal having a wavelength at which an error occurs in the event of an error, to the first optical coupler 43A. The first variable LD 41A outputs an optical signal having a wavelength unused in the normal operation to the first optical coupler 43A.

The first polarization demultiplexer 44A separates an optical signal having a particular wavelength received from the first variable LD 41A or from the first external input unit 42A through the first optical coupler 43A into linearly-polarized waves and outputs the linearly-polarized waves to the first multiplexer 46A and the first 90 degrees rotator 45A. The first polarization demultiplexer 44A is, for example, a first demultiplexer. The first 90 degrees rotator 45A rotates the linearly-polarized waves received from the first polarization demultiplexer 44A by 90 degrees and outputs the rotated linearly-polarized waves to the first multiplexer 46A. The first multiplexer 46A combines the linearly-polarized waves received from the first polarization demultiplexer 44A and the rotated linearly-polarized waves received from the first 90 degrees rotator 45A, and outputs the combined linearly-polarized waves to the second optical splitter 47A, with polarization directions thereof aligned to the same polarization direction. The first 90 degrees rotator 45A and the first multiplexer 46A are, for example, a third adjustor.

The second optical splitter 47A optically branches an optical signal received from the first multiplexer 46A and outputs the optically-branched optical signal to the first IM 48A and the second IM 49A. The first pilot signal generator 54A generates a first pilot signal f1 and a second pilot signal f2 used to intensity-modulate the optically-branched optical signal received from the second optical splitter 47A. The first pilot signal f1 and the second pilot signal f2 may have either the same frequency or different frequencies.

The first IM 48A intensity-modulates the optically-branched optical signal received from the second optical splitter 47A with the first pilot signal f1 from the first pilot signal generator 54A and outputs the optical signal intensity-modulated with the first pilot signal f1 to the first polarization multiplexer 51A. The optical signal intensity-modulated with the first pilot signal f1 superimposes a pattern of PATH ID "A" with a CDMA code "X." The second IM 49A intensity-modulates the optically-branched optical signal received from the second optical splitter 47A with the second pilot signal f2 received from the first pilot signal generator 54A and outputs the optical signal intensity-modulated with the second pilot signal f2 to the second 90 degrees rotator 50A. The optical signal intensity-modulated with the second pilot signal f2 superimposes a pattern of PATH ID "B" with a CDMA code "Y." The second optical splitter 47A, the first IM 48A, and the second IM 49A are, for example, a first modulator.

The second 90 degrees rotator 50A rotates the intensity-modulated optical signal received from the second IM 49A by 90 degrees and outputs the 90 degrees-rotated optical signal to the first polarization multiplexer 51A. The second 90 degrees rotator 50A is, for example, a fourth adjustor. The first polarization multiplexer 51A polarization-combines the intensity-modulated optical signal received from the first IM 48A and the 90 degree-rotated intensity-modulated optical signal received from the second 90 degrees rotator 50A, and outputs an optical signal obtained by the polarization-combination to the wavelength multiplexer 103. The first polarization multiplexer 51A is, for example, a first multiplexer.

The second generator 102 includes a second variable LD 41B, a second external input unit 42B, a third optical coupler 43B, a second polarization demultiplexer 44B, a third 90 degrees rotator 45B, and a second multiplexer 46B. The second generator 102 further includes a fourth optical splitter 47B, a third IM 48B, a fourth IM 49B, a fourth 90 degrees rotator 50B, a second polarization multiplexer 51B, a second level detector 53B, and a second pilot signal generator 54B.

The second external input unit 42B outputs an optical signal having a wavelength at which an error occurs in the event of an error to the third optical coupler 43B. The optical signal of the second external input unit 42B has a different wavelength from the optical signals of the first external input unit 42A and the first variable LD 41A. The second variable LD 41B outputs an optical signal having a wavelength unused in the normal operation to the third optical coupler 43B. The optical signal of the second variable LD 41B has a different wavelength from the optical signals of the first external input unit 42A and the first variable LD 41A.

The second polarization demultiplexer 44B separates an optical signal having a particular wavelength received from the second variable LD 41B or the second external input unit 42B through the third optical coupler 43B into linearly-polarized waves, and outputs the linearly-polarized waves to the second multiplexer 46B and the third 90 degrees rotator 45B. The second polarization demultiplexer 44B is, for example, a second demultiplexer. The third 90 degrees rotator 45B rotates the linearly-polarized waves received from the second polarization demultiplexer 44B by 90 degrees and outputs the rotated linearly-polarized waves to the second multiplexer 46B. The second multiplexer 46B combines the linearly-polarized waves received from the second polarization demultiplexer 44B and the rotated linearly-polarized waves received from the third 90 degrees rotator 45B, and outputs the combined linearly-polarized waves to the fourth optical splitter 47B with polarization directions thereof aligned to the same polarization direction. The third 90 degrees rotator 45B and the second multiplexer 46B are, for example, a fifth adjustor.

The fourth optical splitter 47B optically branches an optical signal received from the second multiplexer 46B and outputs the optically-branched optical signal to the third IM 48B and the fourth IM 49B. The fourth optical splitter 47B, the third IM 48B, and the fourth IM 49B are, for example, a second modulator. The second pilot signal generator 54B generates a third pilot signal f3 and a fourth pilot signal f4 used to intensity-modulate the optically-branched optical signal from the fourth optical splitter 47B. The first to fourth pilot signals may have either the same frequency or different frequencies.

The third IM 48B intensity-modulates the optically-branched optical signal received from the fourth optical splitter 47B with the third pilot signal f3 from the second pilot signal generator 54B and outputs the optical signal intensity-modulated with the third pilot signal f3 to the second polarization multiplexer 51B. The optical signal intensity-modulated with the third pilot signal f3 superimposes a pattern of PATH ID "C" with a CDMA code "P." The fourth IM 49B intensity-modulates the optically-branched optical signal received from the fourth optical splitter 47B with the fourth pilot signal f4 received from the second pilot signal generator 54B and outputs the optical signal intensity-modulated with the fourth pilot signal f4 to the fourth 90 degrees rotator 50B. The optical signal intensity-modulated with the fourth pilot signal f4 superimposes a pattern of PATH ID "D" with a CDMA code "Q."

The fourth 90 degrees rotator 50B rotates the intensity-modulated optical signal received from the fourth IM 49B by 90 degrees and outputs the 90 degrees-rotated optical signal to the second polarization multiplexer 51B. The fourth 90 degrees rotator 50B is, for example, a sixth adjustor. The second polarization multiplexer 51B polarization-combines the intensity-modulated optical signal received from the third IM 48B and the optical signal 90 degree-rotated by the fourth 90 degrees rotator 50B and then intensity-modulated by the fourth IM 49B, and outputs an optical signal obtained by the polarization-combination to the wavelength multiplexer 103. The second polarization multiplexer 51B is, for example, a second multiplexer.

The wavelength multiplexer 103 combines the optical signal received from the first polarization multiplexer 51A and the optical signal received from the second polarization multiplexer 51B, and outputs an optical signal obtained by the combination to the polarization rotator 52. The polarization rotator 52 uses a frequency fr lower than a pilot signal frequency to rotate the optical signal from the wavelength multiplexer 103 between 0° to 90° to output a probe optical signal. The wavelength multiplexer 103 and the polarization rotator 52 are, for example, an output unit.

Figure 16:
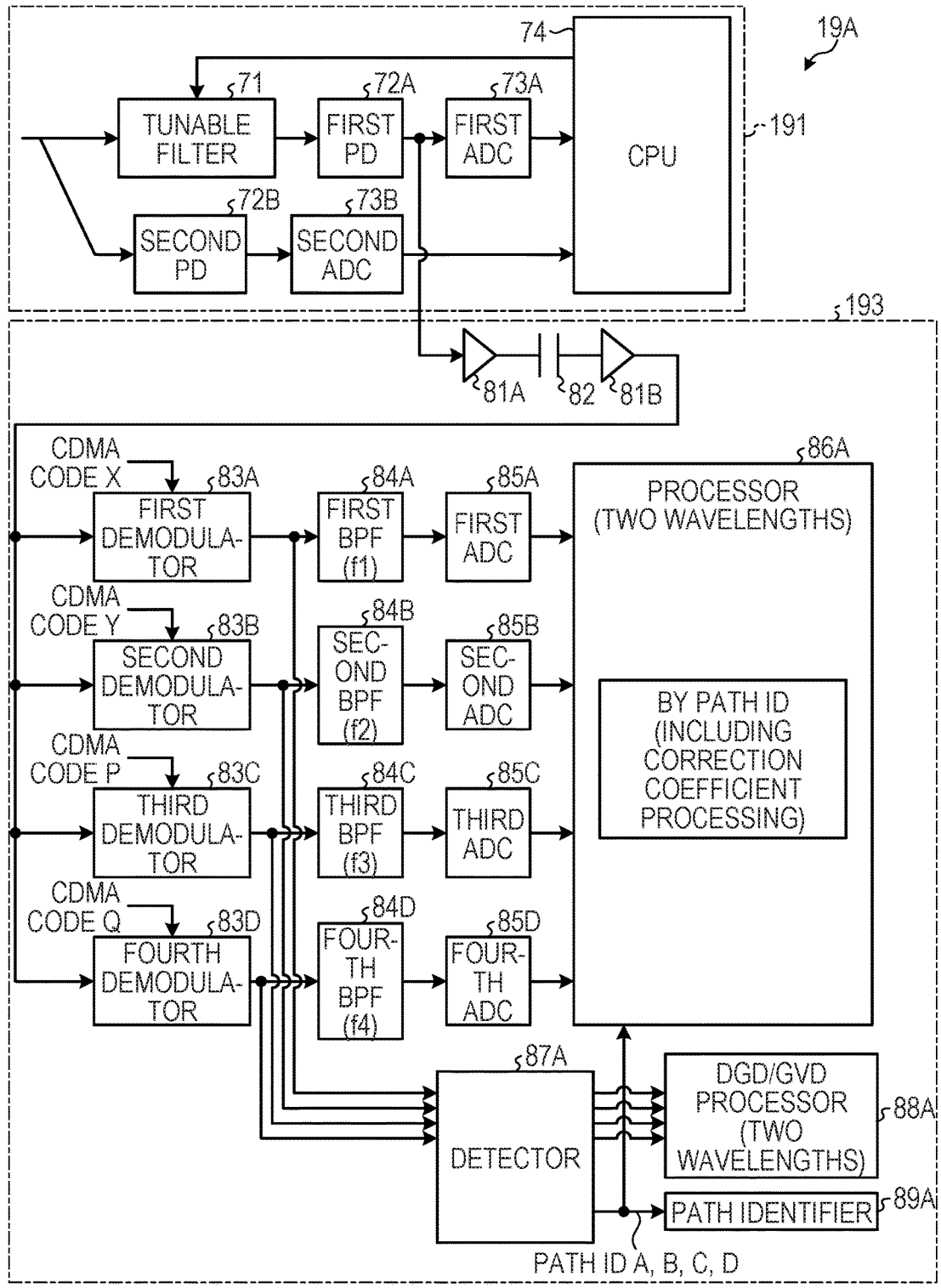
FIG. 16 is a block diagram illustrating one example of an OCM of Second Embodiment.

FIG. 16 is a block diagram illustrating one example of the OCM 19A of Second Embodiment. For the convenience of description, the same elements as the OCM 19 illustrated in FIG. 8 are denoted by the same reference numerals, and explanations on the configuration and operation thereof will not be repeated. The OCM 19A illustrated in FIG. 16 includes a first monitor 191 and a third monitor 193.

The third monitor 193 illustrated in FIG. 16 includes first to fourth demodulators 83A to 83D, first to fourth BPFs 84A to 84D, and first to fourth ADCs 85A to 85D. The third monitor 193 further includes a PDL processor 86A, a detector 87A, a DGD/GVD processor 88A, and a path identifier 89A.

The first demodulator 83A uses the CDMA code "X" to demodulate the pattern of PATH ID "A" and the pulse signal component from the electric signal amplified by the post-amplifier 81B. The first BPF 84A extracts the first pilot signal f1 from the demodulated pulse signal component. The first ADC 85A converts the first pilot signal f1 extracted by the first BPF 84A into a digital value.

The second demodulator 83B uses the CDMA code "Y" to demodulate the pattern of PATH ID "B" and the pulse signal component from the electric signal amplified by the post-amplifier 81B. The second BPF 84B extracts the second pilot signal f2 from the demodulated pulse signal component. The second ADC 85B converts the second pilot signal f2 extracted by the second BPF 84B into a digital value.

The third demodulator 83C uses the CDMA code "P" to demodulate the pattern of PATH ID "C" and the pulse signal component from the electric signal amplified by the post-amplifier 81B. The third BPF 84C extracts the third pilot signal f3 from the demodulated pulse signal component. The third ADC 85C converts the third pilot signal f3 extracted by the third BPF 84C into a digital value.

The fourth demodulator 83D uses the CDMA code "Q" to demodulate the pattern of PATH ID "D" and the pulse signal component from the electric signal amplified by the post-amplifier 81B. The fourth BPF 84D extracts the fourth pilot signal f4 from the demodulated pulse signal component. The fourth ADC 85D converts the fourth pilot signal f4 extracted by the fourth BPF 84D into a digital value.

The PDL processor 86A calculates PDL based on the first pilot signal f1 and the second pilot signal f2, as illustrated in FIG. 14. The PDL processor 86A calculates PDL based on the third pilot signal f3 and the fourth pilot signal f4. That is, the PDL processor 86A can calculate PDL with two wavelengths. The detector 87A detects the head patterns F of PATH ID "A," PATH ID "B," PATH ID "C" and PATH ID "D." The DGD/GVD processor 88A calculates a delay difference based on the head pattern of PATH ID "A," the head pattern of PATH ID "B," the head pattern of PATH ID "C," and the head pattern of PATH ID "D." In addition, the DGD/GVD processor 88A calculates DGD based on the calculated delay difference, the first pilot signal f1, and the second pilot signal f2, as illustrated in FIG. 14. The DGD/GVD processor 88A calculates DGD based on the calculated delay difference, the third pilot signal f3, and the fourth pilot signal f4. That is, the DGD/GVD processor 88A can calculate DGD with two wavelengths.

The DGD/GVD processor 88A calculates GVD based on the first pilot signal f1 and the third pilot signal f3, as illustrated in FIG. 14. In addition, the DGD/GVD processor 88A calculates GVD based on the second pilot signal f2 and the fourth pilot signal f4. The path identifier 89A identifies the PATH IDs of the pilot signals f1 to f4, respectively, detected by the detector 87A.

The generator 15C of the Second Embodiment separates an input optical signal having a first wavelength into polarized optical signals, combines the polarized optical signals with polarization directions thereof aligned to the same polarization direction, optically branches the combined optical signals, and intensity-modulates the optically-branched optical signals with their respective pilot signals. In addition, the generator 15C combines the intensity-modulated polarized optical signals with different polarization directions in the first polarization multiplexer 51A. In addition, the generator 15C separates an input optical signal having a second wavelength into polarized optical signals, combines the polarized optical signals with polarization directions thereof aligned to the same polarization direction, optically branches the combined optical signals, and intensity-modulates the optically-branched optical signals with their respective pilot signals. In addition, the generator 15C combines the intensity-modulated polarized optical signals with different polarization directions in the second polarization multiplexer 51B. In addition, the generator 15C combines the optical signals combined in the first polarization multiplexer 51A and the optical signals combined in the second polarization multiplexer 51B to generate a probe optical signal. As a result, the generator 15C can output a probe optical signal to allow a measurement of GVD as well as PDL and DGD.

The OCM 19A extracts the first to fourth pilot signals f1 to f4 from the probe optical signal, calculates the GVD based on the extracted first and third pilot signals f1 and f3, and calculates the GVD based on the extracted second and fourth pilot signals f2 and f4. As a result, the OCM 19A can use the probe optical signal received from the generator 15C to calculate the GVD.

Figure 17:
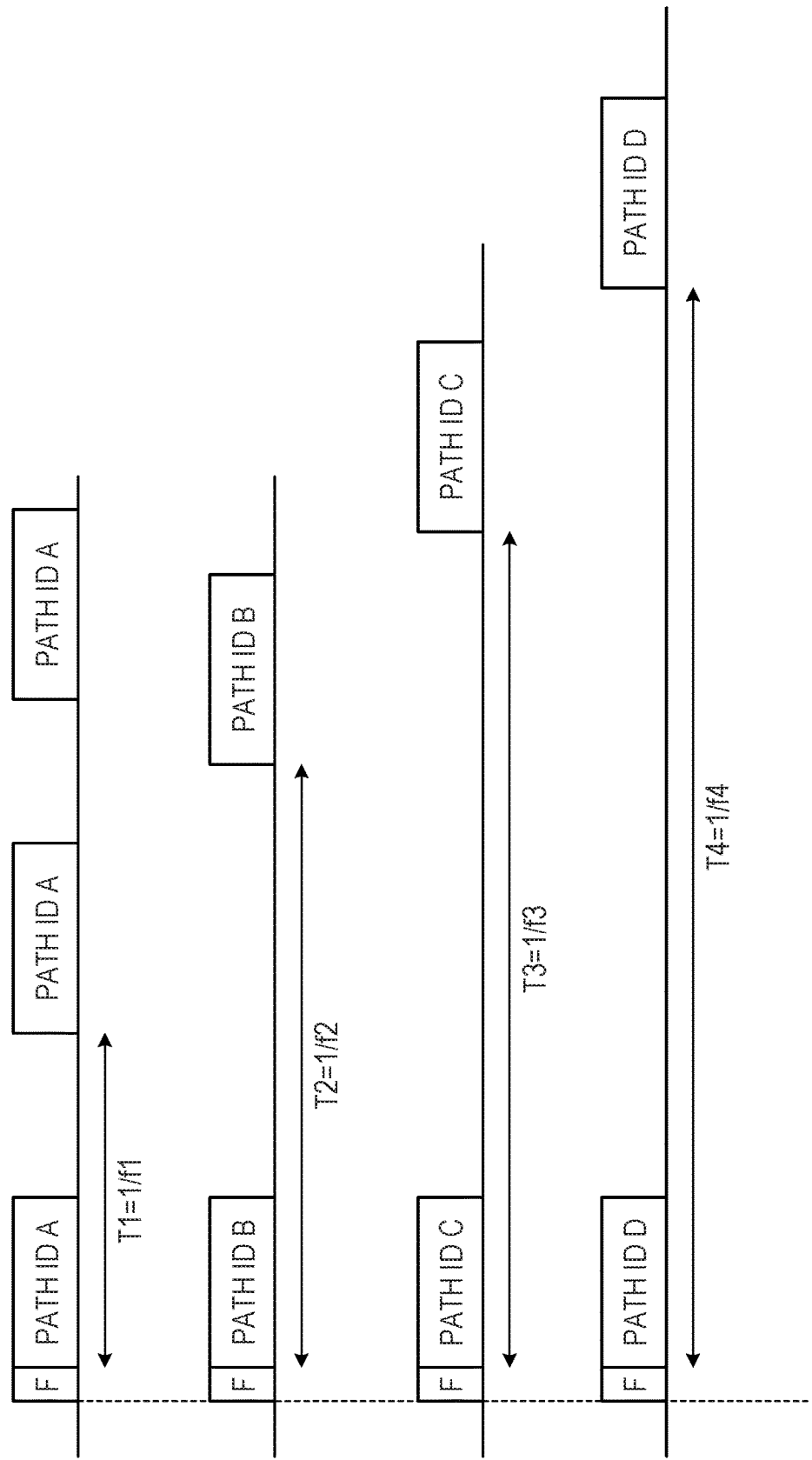
FIG. 17 is an explanatory view illustrating one example of output timings of pilot signals of Second Embodiment.

FIG. 17 is an explanatory view illustrating one example of output timings of the pilot signals of the Second Embodiment. It is here assumed that the period T1 of the first pilot signal f1 is 1/f1, the period T2 of the second pilot signal f2 is 1/f2, the period T3 of the third pilot signal f3 is 1/f3, and the period T4 of the fourth pilot signal f4 is 1/f4. In order to measure DGD and GVD, the generator 15C outputs the first to fourth pilot signals in accordance with the head patterns F of the pilot signals at their respective first transmission timings. Thereafter, the pilot signals are sequentially output with their respective timing periods.

Figure 18:
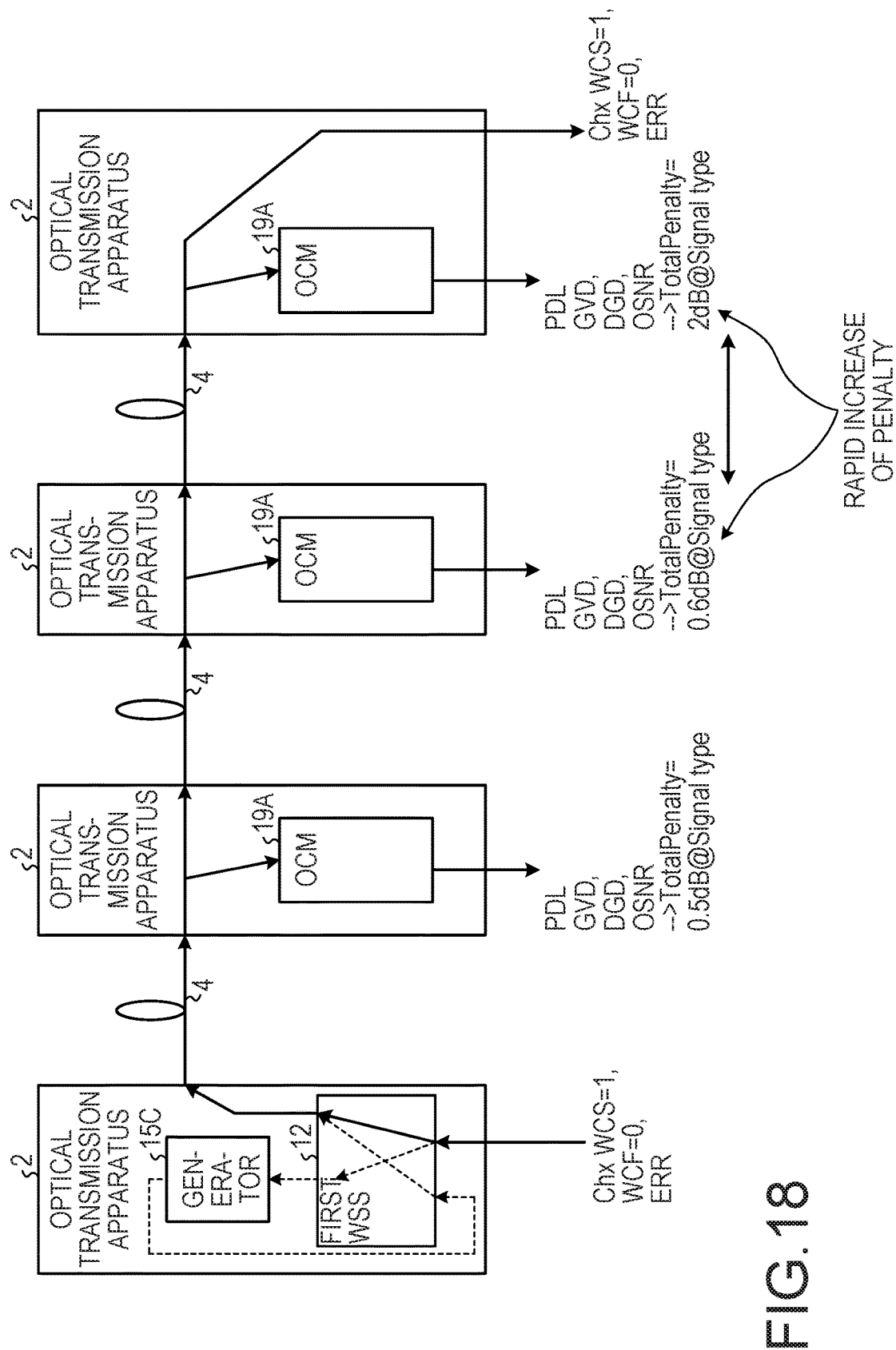
FIG. 18 is an explanatory view illustrating one example of an evaluation method of the optical transmission system.

FIG. 18 is an explanatory view illustrating one example of an evaluation method in the optical transmission system 1. The OCM 19A in each optical transmission apparatus 2 in the optical transmission system 1 illustrated in FIG. 18 calculates PDL, GVD, DGD and OSNR on each transmission section from the probe optical signal generated by each generator 15C in the optical transmission apparatus 2. A monitoring terminal (not illustrated) collects PDL, GVD, DGD and OSNR for each transmission section (PATH ID) from each OCM 19A. The monitoring terminal determines, for each transmission section, whether or not PDL, GVD, DGD and OSNR exceed their respective allowable ranges in accordance with the type of modulation scheme of each path of the transmission section. When it is evaluated that PDL, GVD, DGD and OSNR exceed their respective allowable ranges, this is determined that the transmission section has an error.

The OCM 19A of the Second Embodiment can check whether or not the probe optical signal is actually passing through a scheduled section of the PATH ID in the optical transmission system 1, by identifying the PATH ID of each pilot signal in the probe optical signal. In addition, the OCM 19A can use the first to fourth pilot signals f1 to f4 in the probe optical signal to calculate PDL, DGD and GVD which are the cause of signal deterioration on the transmission section.

Although it has been illustrated in the above Embodiments 1 and 2 that OSNR is calculated with signal power for each of multiplexed wavelengths, OSNR may be calculated using the probe optical signal, as will be described as Third Embodiment below.

Third Embodiment

Figure 19:
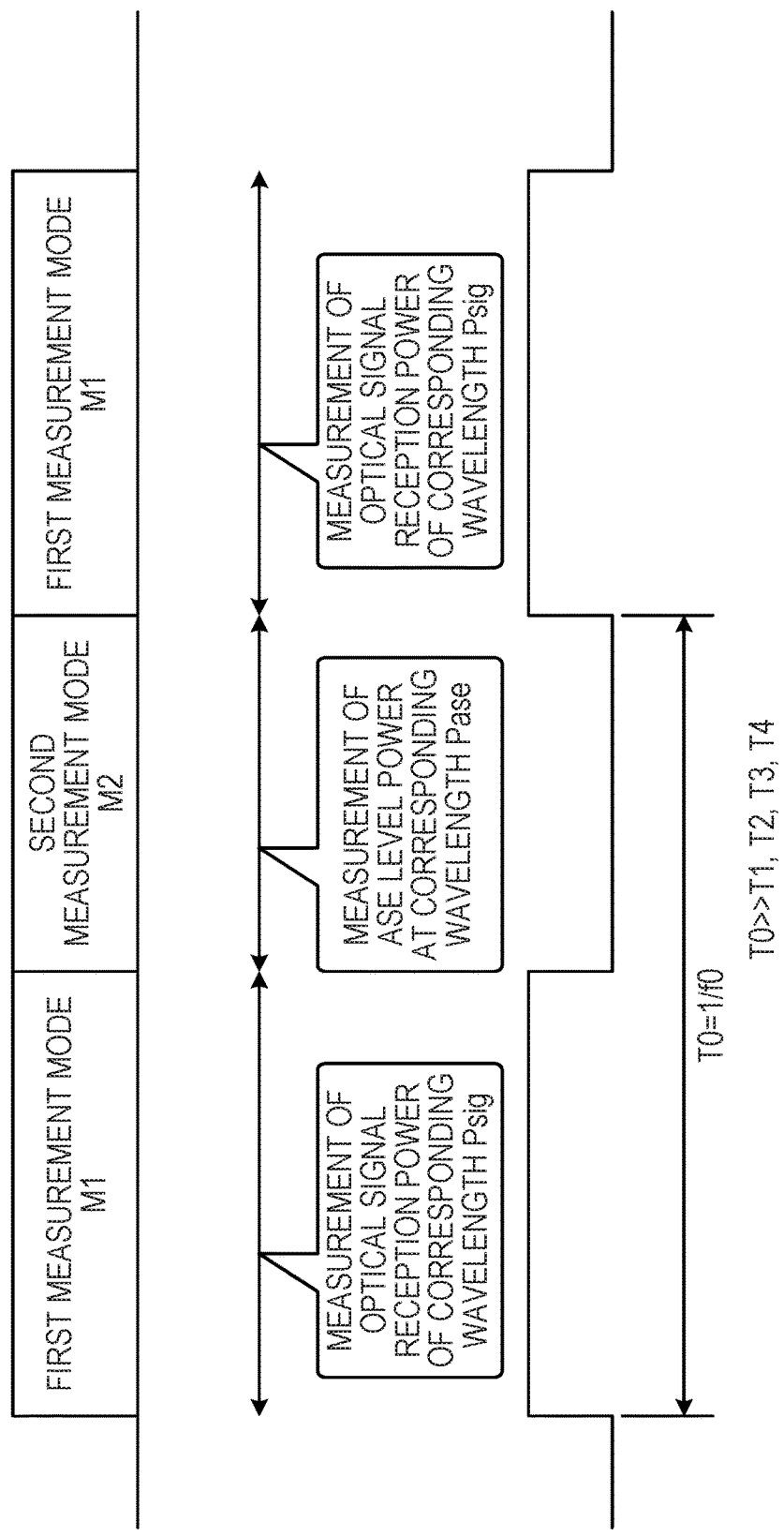
FIG. 19 is an explanatory view illustrating one example of timings of first and second measurement modes of Third Embodiment.

FIG. 19 is an explanatory view illustrating one example of timings of first and second measurement modes of Third Embodiment. A generator 15D of the Third Embodiment allows a periodical switching between a first measurement mode M1 and a second measurement mode M2, as illustrated in FIG. 19. The first measurement mode M1 is a mode for calculating PDL, DGD and the like on a transmission section using a probe optical signal which is turned ON. In addition, the first measurement mode M1 is a mode for using the probe optical signal to calculate the optical power Psig of a relevant wavelength of the probe optical signal. The second measurement mode M2 is a mode for calculating the optical power Pase of ASE (Amplified Spontaneous Emission) when the probe optical signal is turned OFF, i.e., in the absence of a probe optical signal. The CPU 74 of the OCM 19 calculates OSNR of the corresponding wavelength with the Psig/Pase based on the optical power Psig calculated in the first measurement mode M1 and the optical power Pase calculated in the second measurement mode M2. The timing periods T0 of the first measurement mode M1 and the second measurement mode M2 are longer than the timing period T1 of the first pilot signal and the timing period T2 of the second pilot signal. In addition, the timing periods T0 of the first measurement mode M1 and the second measurement mode M2 are longer than the timing period T3 of the third pilot signal and the timing period T4 of the fourth pilot signal.

Figure 20:
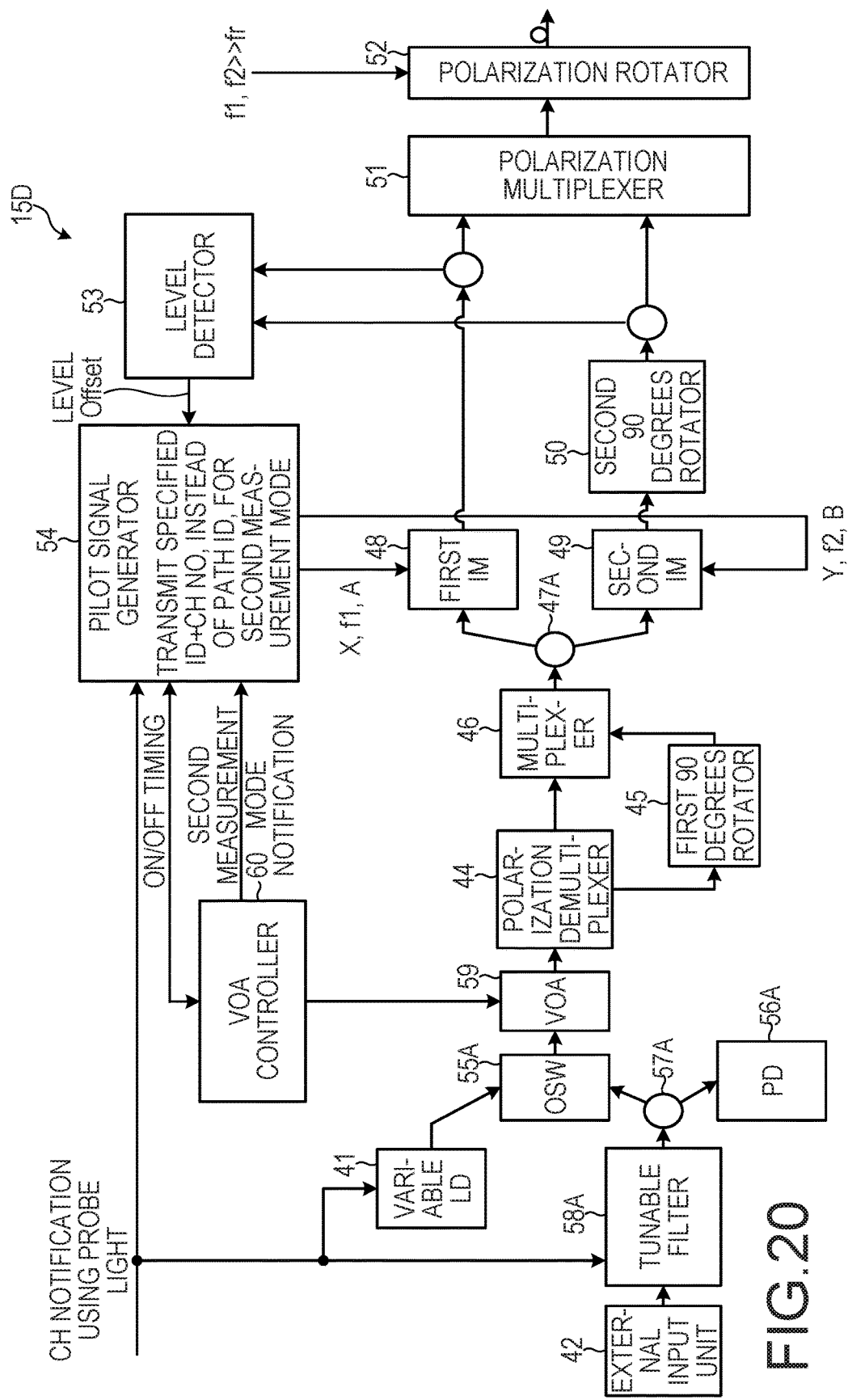
FIG. 20 is a block diagram illustrating one example of a generator of Third Embodiment.

The generator needs to control the probe optical signal to be turned ON/OFF. Therefore, the generator 15D for controlling the probe optical signal to be turned ON/OFF will be described. FIG. 20 is a block diagram illustrating one example of the generator 15D of the Third Embodiment. For the convenience of description, the same elements as the generator 15B illustrated in FIG. 12 are denoted by the same reference numerals, and explanations on the configuration and operation thereof will not be repeated.

The generator 15D illustrated in FIG. 20 is different from the generator 15B illustrated in FIG. 12 in that the generator 15D in FIG. 20 includes a VOA (Variable Optical Attenuator) 59 interposed between the OSW 55A and the polarization demultiplexer 44 for cutting the optical signal from the OSW 55A and a VOA controller 60. The VOA 59 turns ON/OFF the optical signal in the order of milliseconds or less in order to avoid a rapid change.

The VOA controller 60 controls the VOA 59 according to a measurement mode. When the current measurement mode is the first measurement mode M1, the VOA controller 60 controls the VOA 59 to be turned OFF so as to turn ON the probe optical signal. As a result, the VOA 59 outputs the optical signal from the OSW 55A according to the OFF control.

When the current measurement mode is the second measurement mode M2, the VOA controller 60 controls the VOA 59 to be turned ON so as to turn OFF the probe optical signal and, at the same time, notifies the pilot signal generator 54 of the second measurement mode M2. As a result, the VOA 59 cuts the optical signal from the OSW 55A according to the ON control. The PD 56A detects whether an optical signal having a wavelength at which an error occurs presents in the transmission section through the tunable filter 58A from the external input unit 42.

When the PD 56A detects that the optical signal having the wavelength at which the error occurs presents, i.e., when at least one optical signal other than the probe optical signal exists in the transmission section, the pilot signal generator 54 performs an ON/OFF control for the probe optical signal. When the PD 56A detects that the optical signal having the wavelength at which the error occurs does not present, i.e., when at least one optical signal other than the probe optical signal does not exist in the transmission section, the pilot signal generator 54 prohibits the ON/OFF control for the probe optical signal.

The reason for the prohibition of the ON/OFF control is that, when one or more optical signal other than the probe optical signal do not exist in the transmission section, an optical amplifier on the transmission section is shut down since no optical signal exists when the probe optical signal is turned OFF.

The OCM 19 recognizes whether the current measurement mode is the first measurement mode M1 or the second measurement mode M2, based on whether an identification of the PATH ID presents or not in the path identifier 89A, and notifies the CPU 74 of the recognized measurement mode. That is, when the PATH ID is identified, the path identifier 89A recognizes that the current measurement mode is the first measurement mode M1, and notifies the CPU 74 of the first measurement mode M1. When the PATH ID cannot be identified, the path identifier 89A recognizes that the current measurement mode is the second measurement mode M2, and notifies the CPU 74 of the second measurement mode M2.

When the VOA 59 is controlled to be turned OFF, the generator 15D outputs the probe optical signal. In the meantime, when the current measurement mode is the first measurement mode M1, the generator 15D outputs the probe optical signal by including a corresponding wavelength of an OSNR monitoring object as well as a pattern of PATH ID to the pilot signal. As a result, upon recognizing the first measurement mode M1, each OCM 19 on the transmission section receives the probe optical signal and uses the received probe optical signal to calculate PDL and DGD. In addition, the OCM 19 uses the received probe optical signal to calculate the power Psig of the corresponding wavelength of the OSNR monitoring object.

When the VOA 59 is controlled to be turned ON, the generator 15D stops the output of the probe optical signal.

As a result, upon recognizing the second measurement mode M2, each OCM 19 on the transmission section receives an optical signal other than the probe optical signal and calculates the power Pase of an ASE level on the transmission section.

Based on the power Psig and power Pase of the corresponding wavelength, the CPU 74 in the OCM 19 calculates OSNR of the corresponding wavelength of the OSNR monitoring object. As a result, each OCM 19 can use the probe optical signal to calculate OSNR of the corresponding wavelength on the transmission section.

When the current measurement mode is the first measurement mode M1, the generator 15D of the Third Embodiment controls the VOA 59 to be turned OFF so as to turn ON the probe optical signal. As a result, the OCM 19 can use the probe optical signal to calculate PDL, DGD and optical power Psig of the corresponding wavelength of the probe optical signal. When the current measurement mode is the second measurement mode M2, the generator 15D controls the VOA 59 to be turned ON so as to turn OFF the probe optical signal. As a result, the OCM 19 cannot receive the probe optical signal and calculates the optical power Pase indicating the absence of probe optical signal. In addition, the OCM 19 can use the probe optical signal to calculate OSNR of the corresponding wavelength based on the Psig/Pase.

The OCM 19 of the Third Embodiment can use the PATH ID in the probe optical signal to check whether or not the probe optical signal is actually passing through a scheduled section of the PATH ID in the optical transmission system 1. In addition, based on the first and second pilot signals f1 and f2 in the probe optical signal, the OCM 19 can calculate PDL and DGD which are the cause of signal deterioration on the transmission section. In addition, depending on the turning-ON/OFF of the probe optical signal, i.e., depending on whether an optical signal having the corresponding wavelength presents or not, the OCM 19 can calculate the optical power Psig and the optical power Pase and calculate OSNR of the corresponding wavelength with the calculated Psig/Pase.

In the generator 15D of the Third Embodiment, an optical signal is cut in the VOA 59 at the pre stage of the polarization demultiplexer 44 so as to turn OFF the probe optical signal. However, when the first IM 48 and the second IM 49 have sufficient light blocking capability, the output of the probe optical signal may be turned OFF by setting the intensity modulation of the first IM 48 and the second IM 49 to OFF, instead of the VOA 59.

In the meantime, in the generator 15D of the Third Embodiment, since the probe optical signal is turned ON/OFF, an optical signal used for the probe optical signal may prohibit using of an optical signal in operation.

Figure 21:
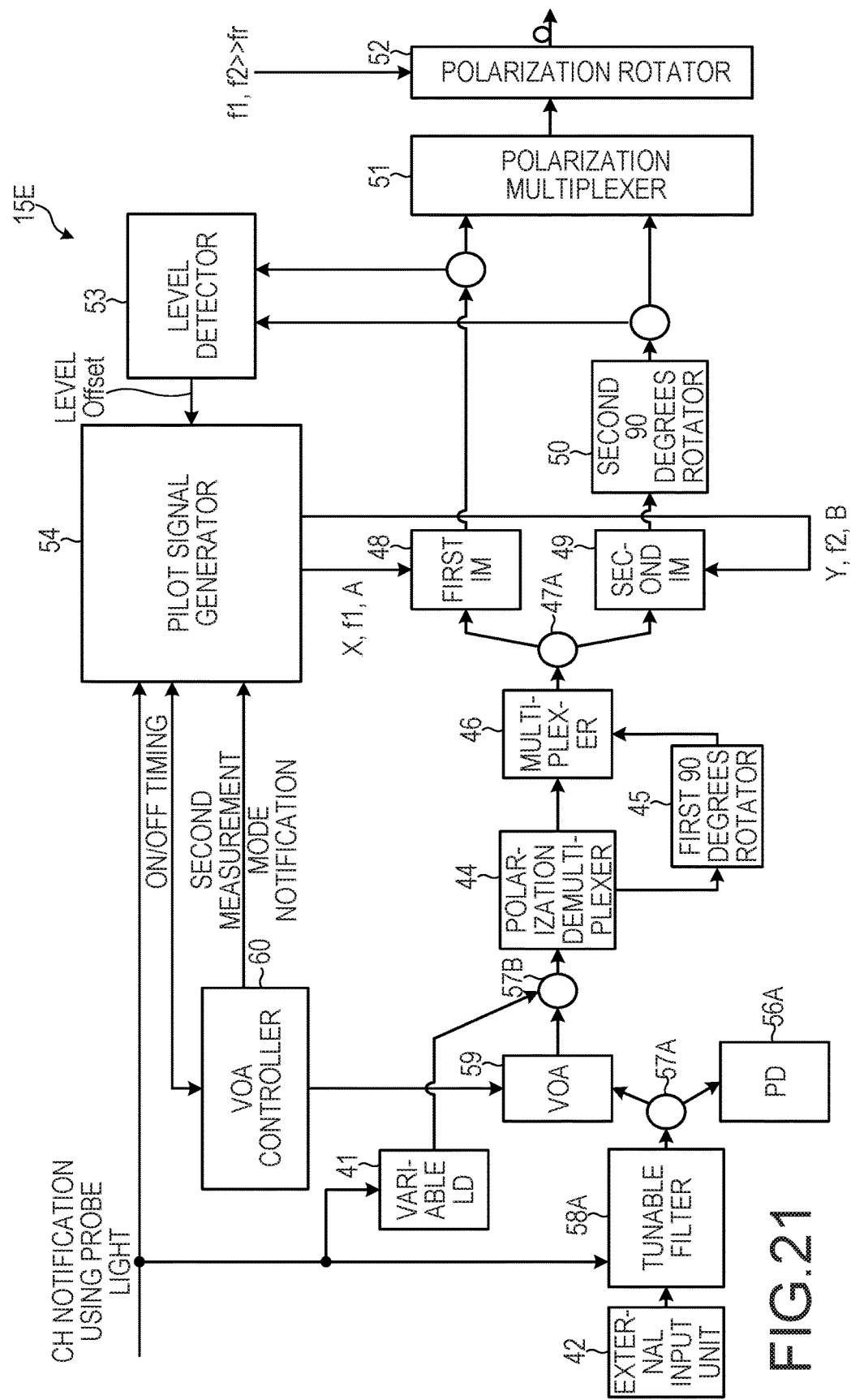
FIG. 21 is a block diagram illustrating one example of another generator.

FIG. 21 is a block diagram illustrating one example of another generator 15E. For the convenience of description, the same elements as the generator 15D illustrated in FIG. 20 are denoted by the same reference numerals, and explanations on the configuration and operation thereof will not be repeated. The generator 15E is different from the generator 15D in that the generator 15E includes an optical coupler 57A for branching the optical signal extracted in the tunable filter 58A, an optical coupler 57B for branching the optical signal of the variable LD 41, and a VOA 59 interposed between the optical coupler 57A and the optical coupler 57B.

If the current measurement mode is the first measurement mode M1, the VOA controller 60 controls the VOA 59 to be turned OFF so as to turn ON the probe optical signal. As a result, the VOA 59 outputs the optical signal from the optical coupler 57A according to the OFF control. If the current measurement mode is the second measurement mode M2, the VOA controller 60 controls the VOA 59 to be turned ON so as to turn OFF the probe optical signal. As a result, the VOA 59 cuts the optical signal from the optical coupler 57A according to the ON control.

If the current measurement mode is the first measurement mode M1, the generator 15E controls the VOA 59 to be turned OFF so as to turn ON the probe optical signal. As a result, the OCM 19 can use the probe optical signal to calculate PDL, DGD and optical power Psig of the corresponding wavelength of the probe optical signal. If the current measurement mode is the second measurement mode M2, the generator 15E controls the VOA 59 to be turned ON so as to turn OFF the probe optical signal. As a result, the OCM 19 cannot receive the probe optical signal and calculates the optical power Pase indicating the absence of probe optical signal. In addition, the OCM 19 can use the probe optical signal to calculate OSNR of the corresponding wavelength based on the Psig/Pase.

Figure 22A:
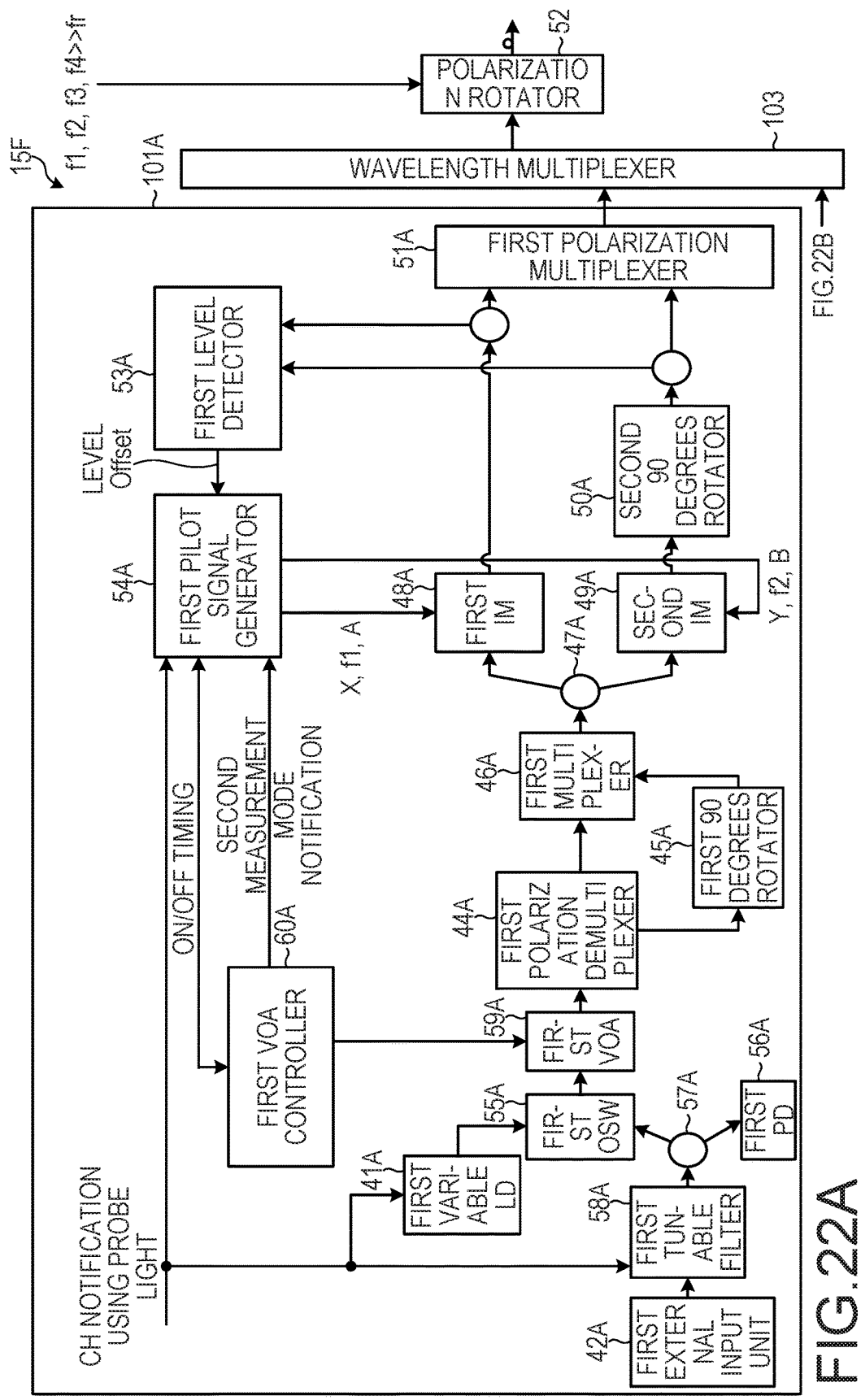

The generators 15D and 15E illustrated in FIGS. 20 and 21 can calculate PDL, DGD and OSNR but cannot calculate GVD. Therefore, a generator 15F capable of calculating GVD in addition to PDL, DGD and OSNR will be described. FIGS. 22A and 22B are an explanatory view illustrating one example of still another generator 15F. For the convenience of description, the same elements as the generator 15A illustrated in FIG. 15 are denoted by the same reference numerals, and explanations on the configuration and operation thereof will not be repeated.

The generator 15F illustrated in FIGS. 22A and 22B includes a first generator 101A, a second generator 102A, a wavelength multiplexer 103, and a polarization rotator 52. The first generator 101A and the second generator 102A use two different wavelengths to generate a probe optical signal.

The first generator 101A includes a first tunable filter 58A, a first optical coupler 57A, a first OSW 55A, a first PD 56A, a first VOA 59A, and a first VOA controller 60A. The first tunable filter 58A extracts an optical signal having a particular wavelength from the first external input unit 42A. The first optical coupler 57A optically branches the optical signal extracted in the first tunable filter 58A. The first OSW 55A switches the optical signal from the first variable LD 41A or the first optical coupler 57A. The first PD 56A detects the optical signal optically-branched in the first optical coupler 57A. The first VOA 59A is interposed between the first OSW 55A and the first polarization demultiplexer 44A, and cuts off the optical signal directed from the first OSW 55A to the first polarization demultiplexer 44A. The first VOA controller 60A controls the first VOA 59A.

When the current measurement mode is the second measurement mode M2, the first VOA controller 60A controls the first VOA 59A to be turned ON so as to turn OFF the probe optical signal and, at the same time, notifies the first pilot signal generator 54A of the second measurement mode M2. As a result, the first VOA 59A cuts off the optical signal directed from the first OSW 55A to the first polarization demultiplexer 44A according to the ON control. The first PD 56A detects whether an optical signal having a wavelength at which an error occurs presents or not, in the transmission section through the first tunable filter 58A from the first external input unit 42A.

When the first PD 56A detects that the optical signal having the wavelength at which the error occurs presents, i.e., when at least one optical signal other than the probe optical signal exists in the transmission section, the first pilot signal generator 54A performs an ON/OFF control for the probe optical signal. When the first PD 56A detects that the optical signal does not present, i.e., when at least one optical signal other than the probe optical signal does not exist in the transmission section, the first pilot signal generator 54A prohibits the ON/OFF control for the probe optical signal.

The second generator 102A includes a second tunable filter 58B, a third optical coupler 57B, a second OSW 55B, a second PD 56B, a second VOA 59B, and a second VOA controller 60B. The second tunable filter 58B extracts an optical signal having a particular wavelength received from the second external input unit 42B. The third optical coupler 57B optically branches the optical signal extracted in the second tunable filter 58B. The second OSW 55B switches the optical signal received from the second variable LD 41B or from the third optical coupler 57B. The second PD 56B detects the optical signal optically-branched in the third optical coupler 57B. The second VOA 59B is interposed between the second OSW 55B and the second polarization demultiplexer 44B, and cuts off the optical signal directed from the second OSW 55B to the second polarization demultiplexer 44B. The second VOA controller 60B controls the second VOA 59B.

When the current measurement mode is the second measurement mode M2, the second VOA controller 60B controls the second VOA 59B to be turned ON so as to turn OFF the probe optical signal and, at the same time, notifies the second pilot signal generator 54B of the second measurement mode M2. As a result, the second VOA 59B cuts off the optical signal directed from the second OSW 55B to the second polarization demultiplexer 44B according to the ON control. The second PD 56B detects whether an optical signal having a wavelength at which an error occurs presents in the transmission section through the second tunable filter 58B from the second external input unit 42B.

When the second PD 56B detects the presence of the optical signal having the wavelength at which the error occurs, i.e., when at least one optical signal other than the probe optical signal exists in the transmission section, the second pilot signal generator 54B performs an ON/OFF control for the probe optical signal. When the second PD 56B detects the absence of the optical signal, i.e., when at least one optical signal other than the probe optical signal does not exist in the transmission section, the second pilot signal generator 54B prohibits the ON/OFF control for the probe optical signal.

When the first VOA 59A is controlled to be turned ON, the first generator 101A outputs an optical signal of the first pilot signal and the second pilot signal to the wavelength multiplexer 103. When the second VOA 59B is controlled to be turned ON, the second generator 102A outputs an optical signal of the third pilot signal and the fourth pilot signal to the wavelength multiplexer 103. The wavelength multiplexer 103 combines the optical signal received from the first generator 101A and the optical signal received from the second generator 102A, and outputs an optical signal obtained by the combination to the polarization rotator 52. The polarization rotator 52 rotates the optical signal to output a probe optical signal.

When the first VOA 59A and the second VOA 59B are controlled to be turned OFF, the generator 15F outputs the probe optical signal. As a result, each OCM 19 on the transmission section can receive the probe optical signal and use the received probe optical signal to calculate PDL, DGD and GVD. At this time, the OCM 19 uses the probe optical signal from the generator 15F to calculate the power Psig of the corresponding wavelength. When the first VOA 59A and the second VOA 59B are controlled to be turned ON, the generator 15F stops the output of the probe optical signal. As a result, each OCM 19 on the transmission section receives an optical signal other than the probe optical signal and calculates the power Pase of an ASE level on the transmission section. The CPU 74 in the OCM 19 calculates OSNR based on the power Psig and power Pase of the corresponding wavelength. As a result, each OCM 19 can measure OSNR on the transmission section.

In addition, in order to prevent an optical amplifier from being shut down due to signal disconnection in the ON/OFF control for the probe optical signal, one dummy optical signal may be always inserted on the optical transmission line.

As described above, since the optical amplifier is shut down when an optical signal is disconnected in the optical transmission line, the probe optical signal may be turned ON/OFF alternately between the first generator 101A and the second generator 102A, thereby providing either optical signal which is turned ON. For example, when a probe optical signal having a wavelength used in the first generator 101A is turned ON (the first measurement mode), a probe optical signal having a wavelength used in the second generator 102A is turned OFF (the second measurement mode). At this time, the OCM 19 calculates the signal power Psig of the wavelength used in the first generator 101A and the signal power Pase of the wavelength unused in the second generator 102A. When a probe optical signal having a wavelength used in the second generator 102A is turned ON, a probe optical signal having a wavelength used in the first generator 101A is turned OFF. At this time, the OCM 19 calculates the signal power Psig of the wavelength used in the second generator 102A and the signal power Pase of the wavelength unused in the first generator 101A. As a result, since the turning-ON/OFF of the probe optical signal is controlled to alternate between the first generator 101A and the second generator 102A, it is possible to prevent a shutdown due to signal disconnection in the ON/OFF control for the probe optical signal.

In the above embodiments, since the PATH IDs of the pilot signals in the probe optical signal are encoded with the CDMA code, the pilot signals may not be set to different frequencies. However, different frequencies may be used to facilitate separation between pilot signals.

Although it has been illustrated in the above embodiments that the pilot signals are encoded with different CDMA codes, since the pilot signals in the probe optical signal are set to different frequencies, the pilot signals may be encoded with the same CDMA code.

In the OCM 19 of the above embodiments, since the tunable filter 58 is contained in the first monitor 101, the calculation of PDL and DGD and the identification of PATH ID may be performed only when a wavelength of a probe optical signal to be monitored is selected by the tunable filter 58.

In the above embodiments, an optical signal having a wavelength at which an error occurs or an optical signal having a wavelength unused is used to generate the probe optical signal. However, since an intensity-modulated pilot signal has a low frequency, the probe optical signal may be generated using an optical signal in operation which is less affected by the pilot signal.

Figure 23:
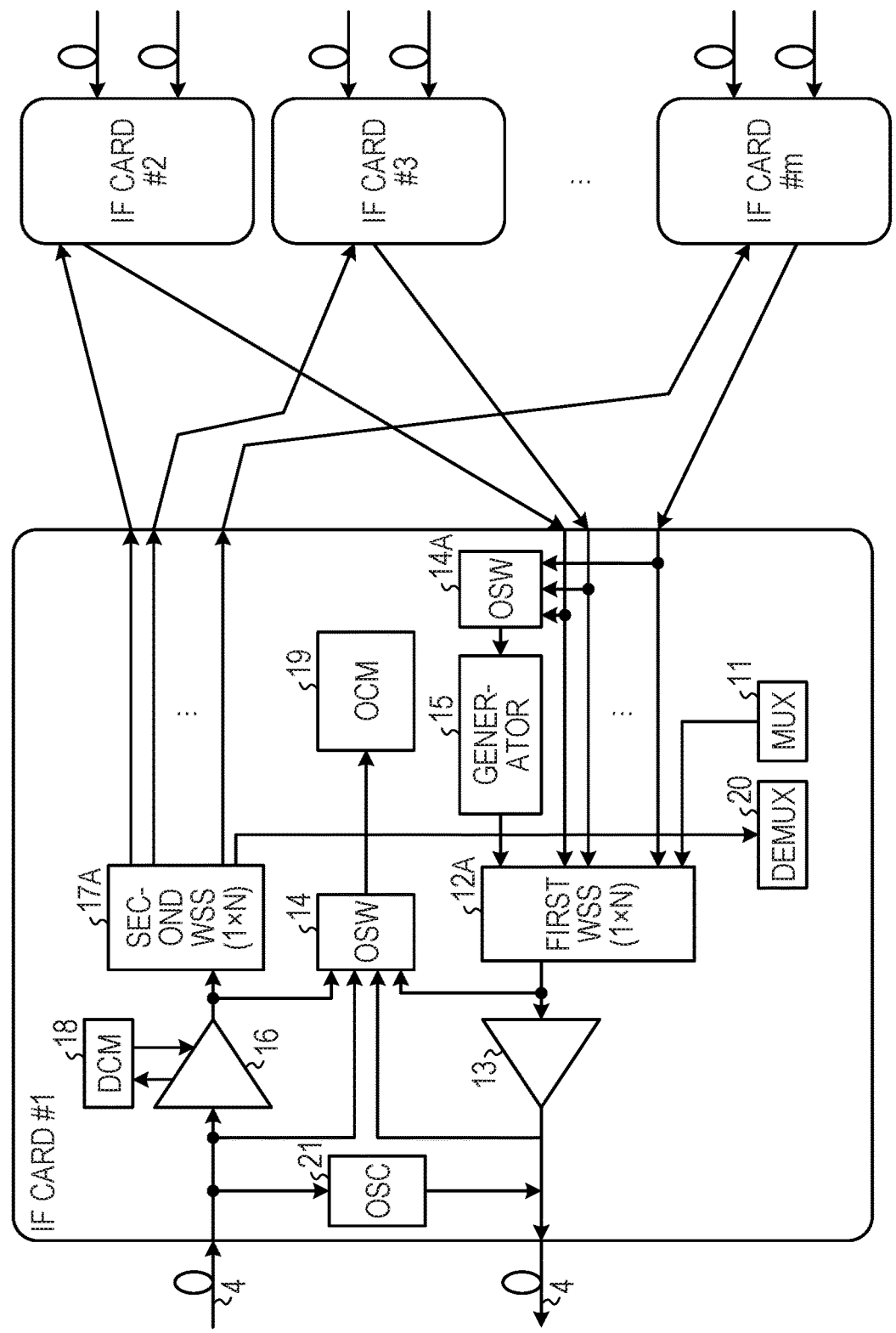
FIG. 23 is a block diagram illustrating one example of another IF card.

It has been illustrated in the above embodiments that an IF card includes the first WSS 12 having N input ports and two output ports and the second WSS 17 having two input ports and N output ports. However, a first WSS 12A having N input ports and one output port, and a second WSS 17A having one input port and N output ports may also be employed. FIG. 23 is a block diagram illustrating one example of another IF card.

The IF card illustrated in FIG. 23 includes an OSW 14A located at the input stage of the first WSS 12A and inputs an optical signal optically-branched in the OSW 14A to the first WSS 12A and the generator 15. The OSW 14A inputs the optically-branched optical signal to the generator 15. As a result, since the generator 15 may acquire an optical signal having a wavelength used for the probe optical signal even with the first WSS 12A having the one output port, the present disclosure can be applied to this IF card.

Although it has been illustrated in the above embodiments that the second monitor 192 is contained in the OCM 19, the second monitor 192 may be alone incorporated in the optical transmission apparatus 2 or the repeater 3.

Although it has been illustrated in the above embodiments that PDL is calculated based on the maximum amplitude of the first pilot signal f1 and the maximum amplitude of the second pilot signal f2 of the probe optical signal, PDL may also be calculated based on an amplitude average. In addition, although it has been illustrated in the above embodiments that DGD is calculated based on a temporal difference between the maximum amplitude of the first pilot signal f1 and the maximum amplitude of the second pilot signal f2 of the probe optical signal, the present disclosure is not limited thereto.

Figure 24A:
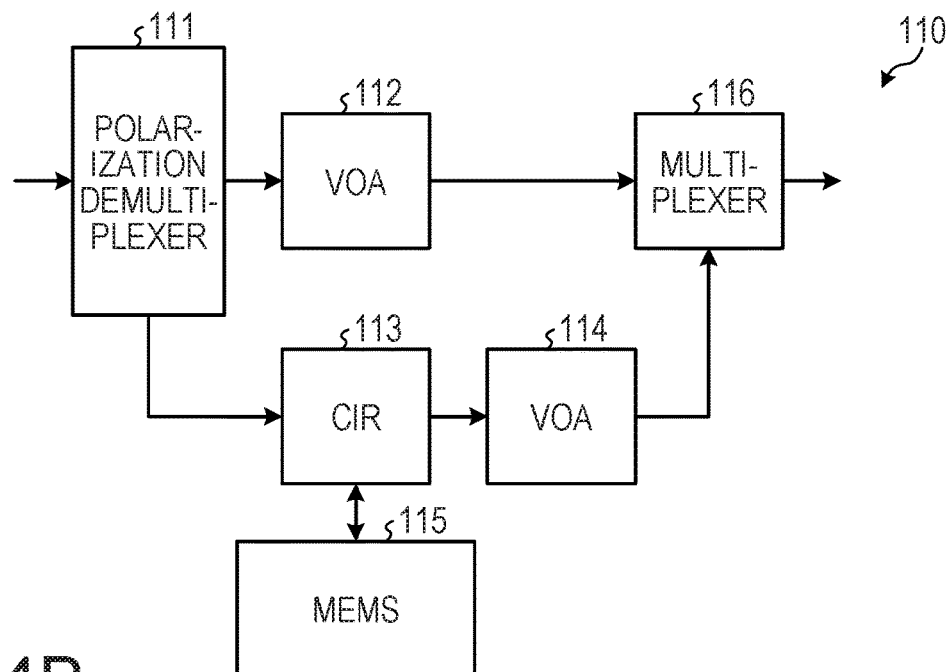
FIGS. 24A-C are an explanatory view illustrating one example of a reset circuit.
Figure 24B:
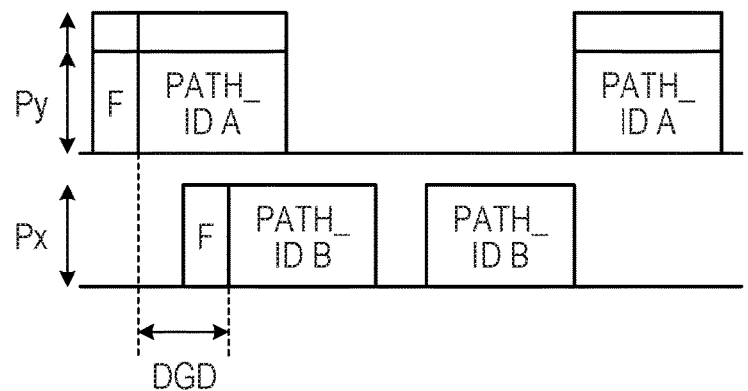
Figure 24C:
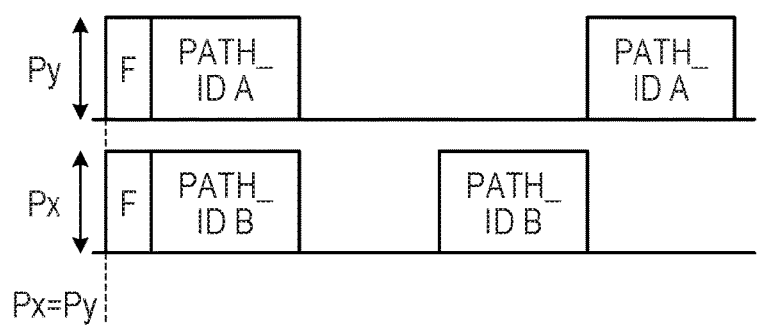

In the above embodiments, the probe optical signal generated in the generator 15 is used to calculate a polarization-dependent evaluation value and the like in the OCM 19. However, a reset circuit which reuses the probe optical signal received from another generator 15 to calculate a polarization-dependent evaluation value on a different transmission section may be incorporated in the optical transmission apparatus 2 or the repeater 3. FIGS. 24A-C are an explanatory view illustrating one example of a reset circuit 110.

The reset circuit 110 illustrated in FIG. 24 is used to initialize a probe optical signal received from another generator 15 and then reuse the initialized probe optical signal for a different transmission section located after the reset circuit 110. The reset circuit 110 illustrated in (A) of FIG. 24 includes a polarization demultiplexer 111, a VOA 112, a CIR 113, a VOA 114, an MEMS (Micro Electrical Mechanical System) 115, and a multiplexer 116.

The polarization demultiplexer 111 separates the probe optical signal received from another generator 15 into polarized waves and separates the polarized waves into an optical signal superimposing a first pilot signal and an optical signal superimposing a second pilot signal. The polarization demultiplexer 111 outputs the optical signal superimposing the second pilot signal to the VOA 112 and outputs the optical signal superimposing the first pilot signal to the CIR 113. The MEMS 115 calculates DGD between the first pilot signal and the second pilot signal, as illustrated in (B) of FIG. 24. The CIR 113 adjusts the phase of the optical signal superimposing the first pilot signal so as to alleviate the delay difference, according to a phase adjustment signal of the MEMS 115, and outputs the phase-adjusted optical signal to the VOA 114.

The VOA 112 adjusts an output level of the second pilot signal to a predetermined level and outputs an optical signal of the adjusted second pilot signal to the multiplexer 116. The VOA 114 adjusts an output level of the first pilot signal of the optical signal phased-adjusted in the CIR 113 to a predetermined level and outputs the adjusted optical signal to the multiplexer 116. The VOA 112 and the VOA 114 have the same output level, for example, in generating the probe optical signal.

That is, the second pilot signal which is an output of the VOA 112 and the first pilot signal which is an output of the VOA 114 have the same level at the same phase, becoming an initialized state as illustrated in (C) of FIG. 24.

The multiplexer 116 combines the optical signal superimposing the second pilot signal of the VOA 112 and the optical signal superimposing the first pilot signal of the VOA 114, and outputs an optical signal obtained by the combination under a state where the probe optical signal is initialized. As a result, since the probe optical signal generated in the generator 15 can be reset and output by the reset circuit 110, it is possible to reuse the probe optical signal.

The OCM 19 can use the probe optical signal from the reset circuit 110 to calculate a polarization-dependent evaluation value of PDL and DGD on a new transmission section from the reset circuit 110.

Elements of the various parts illustrated above may not be necessarily configured physically as illustrated. In other words, the detailed forms of distribution and integration of the various parts are not limited to those illustrated but some or all thereof may be functionally or physically distributed or integrated randomly depending on various types of loads and use situations.

Various processing functions of various apparatuses may be entirely or partially performed on a CPU (Central Processing Unit), a DSP (Digital Signal Processing), a FPGA (Field Programmable Gate Array) or the like. In addition, the various processing functions may be entirely or partially performed on a program interpreted and executed by a CPU or the like or on hardware by a wired logic.

An area storing a variety of information may be configured with, for example, a ROM (Read Only Memory) or a RAM (Random Access Memory) such as SDRAM (Synchronous Dynamic RAM), NRAM (Magnetoresistive RAM), NVRAM (Non Volatile RAM) or the like.

For the embodiments including the present embodiment, the following additional statements are further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A probe generator comprising:
   a first demultiplexer configured to branch a first optical signal having a first wavelength into at least a first polarized optical signal and a second polarized optical signal;
   a first adjustor configured to adjust the first polarized optical signal such that polarization of the first polarized optical signal and the second polarized optical signal have a same polarization direction, and to combine the adjusted first polarized optical signal and the second polarized optical signal into a second optical signal;
   a first modulator configured to branch the second optical signal into at least a first split optical signal and a second split optical signal, and to intensity-modulate the first split optical signal with a first pilot signal and the second split optical signal with a second pilot signal;
a second adjustor configured to adjust the intensity-modulated second split optical signal such that the intensity-modulated second split optical signal has a different polarization direction than the intensity-modulated first split optical signal;
an output unit configured to combine the second split optical signal adjusted by the second adjustor and the intensity-modulated first split optical signal to thereby generate a probe optical signal; and
a generator configured
to generate the first pilot signal so that the intensity modulation by the first modulator superimposes first identification information identifying a first transmission section to be monitored on the first split optical signal, and
to generate the second pilot signal so that the intensity modulation by the first modulator superimposes second identification information identifying a second transmission section to be monitored on the second split optical signal.

2. The probe generator according to claim 1, further comprising:
a variable optical attenuator which is controllable to turned ON to cut the first optical signal and thereby turn OFF the probe optical signal, and to be turned OFF to not cut the first optical signal and thereby turn ON the probe optical signal; and
a controller configured to control the variable optical attenuator so as to turn the probe optical signal ON and OFF.

3. The probe generator according claim 1, further comprising:
a second demultiplexer configured to branch a third optical signal having a second wavelength different from the first wavelength into at least a third polarized optical signal and a fourth polarized optical signal;
a third adjustor configured to adjust the third polarized optical signal such that polarization of the third polarized optical signal and the fourth polarized optical signal have the same polarization direction, and to combine the adjusted third polarized optical signal and the fourth polarized optical signal into a fourth optical signal;
a second modulator configured to branch the fourth optical signal into at least a third split optical signal and a fourth split optical signal, and to intensity-modulate the third split optical signal with a third pilot signal and the fourth split optical signal with a fourth pilot signal;
a fourth adjustor configured to adjust the intensity-modulated fourth split optical signal such that the intensity-modulated fourth split optical signal has a different polarization direction than the intensity-modulated third split optical signal; and
a multiplexer configured to combine the fourth split optical signal adjusted by the fourth adjustor and the intensity-modulated third split optical signal,
wherein the output unit combines the combined second split optical signal adjusted by the second adjustor and the intensity-modulated first split optical signal, with the combined fourth split optical signal adjusted by the fourth adjustor and the intensity-modulated third split optical signal, to thereby generate the probe optical signal.

4. The probe generator according to claim 3, further comprising:
a first variable optical attenuator which is controllable to turn ON to cut the first optical signal, and to be turned OFF to not cut the first optical signal;
a first controller configured to control the first variable attenuator so as to turn OFF/ON, to thereby turn ON/OFF, respectively, the combined second split optical signal adjusted by the second adjustor and the intensity-modulated first split optical signal;
a second variable optical attenuator which is controllable to turn ON to cut the third optical signal, and to be turned OFF to not cut the third optical signal; and
a second controller configured to control the second variable attenuator so as to turn OFF/ON, to thereby turn ON/OFF, respectively, the combined fourth split optical signal adjusted by the fourth adjustor and the intensity-modulated third split optical signal.

5. The probe generator according to claim 4,
wherein the first controller controls the first variable attenuator to turn ON when the second controller controls the second variable attenuator to turn OFF, and
wherein the second controller controls the second variable attenuator to turn ON when the first controller controls the first variable attenuator to turn OFF.

6. An optical transmission apparatus comprising:
a first demultiplexer configured to branch a first optical signal having a first wavelength into at least a first polarized optical signal and a second polarized optical signal;
a first adjustor configured to adjust the first polarized optical signal such that polarization of the first polarized optical signal and the second polarized signal have a same polarization direction, and to combine the adjusted first polarized optical signal and the second polarized optical signal into a second optical signal;
a first modulator configured to branch the second optical signal into at least a first split optical signal and a second split optical signal, and to intensity-modulate the first split optical signal with a first pilot signal and the second split optical signal with a second pilot signal;
a second adjustor configured to adjust the intensity-modulated second split optical signal such that the intensity-modulated second split optical signal has a different polarization direction than the intensity-modulated first split optical signal;
an output unit configured to combine the second split optical signal adjusted by the second adjustor and the intensity-modulated first split optical signal to thereby generate a probe optical signal that is output from the optical transmission apparatus;
a generator configured
to generate the first pilot signal so that the intensity modulation by the first modulator superimposes first identification information identifying a first transmission section to be monitored on the first split optical signal, and
to generate the second pilot signal so that the intensity modulation by the first modulator superimposes second identification information identifying a second transmission section to be monitored on the second split optical signal;
an extractor configured to extract first and second pilot signals from a probe optical signal received from another optical transmission apparatus included in the optical network; and a calculator configured to calculate a polarization-dependent evaluation value based on the extracted first and second pilot signals.

7. The optical transmission apparatus according to claim 6, further comprising:
a second demultiplexer configured to branch a third optical signal having a second wavelength different from the first wavelength into at least a third polarized optical signal and a fourth polarized optical signal;
a third adjustor configured to adjust the third polarized optical signal such that polarization of the third polarized optical signal and the fourth polarized optical signal have the same polarization direction, and to combine the adjusted third polarized optical signal and the fourth polarized optical signal into a fourth optical signal;
a second modulator configured to branch the fourth optical signals into at least a third split optical signal and a fourth split optical signal and to intensity-modulate the third split optical signal with a third pilot signal and the fourth split optical signal with a fourth pilot signal;
a fourth adjustor configured to adjust the intensity-modulated fourth split optical signal such that the intensity-modulated fourth split optical signal has a different polarization direction than the intensity-modulated third split optical signal; and
a multiplexer configured to combine the fourth split optical signal adjusted by the fourth adjustor and the intensity-modulated third split optical signal,
wherein the output unit combines the combined second split optical signal adjusted by the second adjustor and the intensity-modulated first split optical signal, with the combined fourth split optical signal adjusted by the fourth adjustor and the intensity-modulated third split optical signal to, thereby generate the probe optical signal that is output from the optical transmission apparatus,
wherein the extractor extracts third and fourth pilot signals from the probe optical signal received from the another optical transmission apparatus; and wherein the calculator calculates a polarization-dependent evaluation value including a GVD (Group Velocity Dispersion) based on the extracted third and fourth pilot signals.

8. A probe generating method comprising:
branching a first optical signal into at least a first polarized optical signal and a second polarized optical signal;
adjusting the first polarized optical signal such that polarization of the first polarized optical signal and the second polarized optical signal have a same polarization direction;
combining the adjusted first polarized optical signal and the second polarized optical signal into a second optical signal;
branching the second optical signal into at least a first split optical signal and a second split optical signal;
generating first and second pilot signals;
intensity-modulating the first split optical signal with the first pilot signal and the second split optical signal with the second pilot signal;
adjusting the intensity-modulated second split optical signal such that the intensity-modulated second split optical signal has a different polarization direction than the intensity-modulated first split optical signal; and
combining the adjusted second split optical signal and the intensity-modulated first split optical signal to thereby generate a probe optical signal,
wherein the generating the first and second pilot signals
generates the first pilot signal so that the intensity-modulating superimposes first identification information identifying a first transmission section to be monitored on the first split optical signal, and
generates the second pilot signal so that the intensity-modulating superimposes second identification information identifying a second transmission section to be monitored on the second split optical signal.

* * * * *